US012101194B2

(12) United States Patent
Muruganathan et al.

(10) Patent No.: US 12,101,194 B2
(45) Date of Patent: Sep. 24, 2024

(54) HARQ CODEBOOK CONSTRUCTION WITH FEEDBACK ENABLING/DISABLING PER HARQ PROCESS

(71) Applicant: Telefonaktiebolaget LM Ericsson (publ), Stockholm (SE)

(72) Inventors: Siva Muruganathan, Stittsville (CA); Robert Baldemair, Solna (SE); Shiwei Gao, Nepean (CA); Xingqin Lin, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/203,692

(22) Filed: May 31, 2023

(65) Prior Publication Data
US 2023/0308226 A1 Sep. 28, 2023

Related U.S. Application Data

(63) Continuation of application No. 17/766,408, filed as application No. PCT/IB2020/059279 on Oct. 2, 2020, now Pat. No. 11,722,263.
(Continued)

(51) Int. Cl.
*H04L 1/1829* (2023.01)
*H04L 1/1607* (2023.01)
(Continued)

(52) U.S. Cl.
CPC .......... *H04L 1/1854* (2013.01); *H04L 1/1607* (2013.01); *H04L 1/1887* (2013.01); *H04L 1/1896* (2013.01); *H04W 72/23* (2023.01)

(58) Field of Classification Search
CPC ... H04W 28/04; H04W 72/04; H04W 72/042; H04W 88/08; H04W 72/23;
(Continued)

(56) References Cited

U.S. PATENT DOCUMENTS 8,312,337 B2    11/2012  Park et al.
11,621,804 B2*   4/2023  Gao ...................... H04L 5/0092
                                                                370/329
(Continued)

FOREIGN PATENT DOCUMENTS

CN        109639398 A      4/2019
CN        110168986 A      8/2019
(Continued)

OTHER PUBLICATIONS

Author Unknown, "Technical Specification Group Radio Access Network; Study on New Radio (NR) to support non-terrestrial networks (Release 15)," Technical Report 38.811, Version 15.1.0, Jun. 2019, 3GPP Organizational Partners, 126 pages.
(Continued)

*Primary Examiner* — Peter G Solinsky
*Assistant Examiner* — Sanjay K Dewan
(74) *Attorney, Agent, or Firm* — Withrow & Terranova, PLLC

(57) ABSTRACT

Systems and methods are disclosed for dynamic Hybrid Automatic Repeat Request (HARQ) codebook construction with enabling or disabling of HARQ Acknowledgment (HARQ-ACK) feedback per HARQ process. In one embodiment, a method performed by a wireless communication device comprises receiving, from a network node, information that configures the wireless communication device with a first set of HARQ processes for which HARQ-ACK feedback is disabled and a second set of HARQ processes for which HARQ-ACK feedback is enabled. The method further comprises receiving first downlink control information that schedules a first downlink shared channel transmission and determining that the transmission corresponds to one of the first set of HARQ processes for which HARQ-ACK feedback is disabled. The method further com-
(Continued)

prises, upon making this determination, performing a first set of actions for HARQ-ACK feedback generation for HARQ processes with HARQ-ACK feedback disabled.

11 Claims, 15 Drawing Sheets

Related U.S. Application Data

(60) Provisional application No. 62/910,939, filed on Oct. 4, 2019.

(51) Int. Cl.
*H04L 1/1867* (2023.01)
*H04W 72/23* (2023.01)

(58) Field of Classification Search
CPC ... H04L 5/0007; H04L 1/1854; H04L 1/1607; H04L 1/1887; H04L 1/1896
USPC .......................................................... 370/329
See application file for complete search history.

(56) References Cited

U.S. PATENT DOCUMENTS

| | | | |
|---|---|---|---|
| 2010/0281322 A1 | 11/2010 | Park et al. | |
| 2014/0269338 A1 | 9/2014 | Jung et al. | |
| 2016/0261391 A1* | 9/2016 | Chen | H04L 1/1861 |
| 2018/0014298 A1 | 1/2018 | Sun et al. | |
| 2021/0006356 A1* | 1/2021 | Khoshnevisan | H04L 1/1864 |
| 2021/0014004 A1 | 1/2021 | Khoshnevisan et al. | |
| 2021/0050950 A1 | 2/2021 | Zhou et al. | |
| 2021/0211237 A1 | 7/2021 | Yang et al. | |
| 2021/0288756 A1 | 9/2021 | Shrestha et al. | |
| 2022/0038243 A1 | 2/2022 | Shrestha et al. | |
| 2022/0052790 A1 | 2/2022 | Lei et al. | |
| 2022/0140954 A1* | 5/2022 | Kim | H04L 1/1861 370/329 |
| 2022/0376844 A1 | 11/2022 | Muruganathan et al. | |
| 2023/0090792 A1* | 3/2023 | Zhou | H04L 5/0087 370/329 |
| 2023/0091988 A1* | 3/2023 | Li | H04L 1/1685 370/329 |
| 2023/0095598 A1* | 3/2023 | Zhang | H04L 1/1896 370/329 |
| 2023/0115228 A1* | 4/2023 | Zhou | H04L 1/1812 370/329 |

FOREIGN PATENT DOCUMENTS

| | | |
|---|---|---|
| EP | 3667981 A1 | 6/2020 |
| WO | 2019029727 A1 | 2/2019 |
| WO | 2019222881 A1 | 11/2019 |

OTHER PUBLICATIONS

Author Unknown, "Technical Specification Group Radio Access Network; NR; Physical layer procedures for control (Release 15)," Technical Specification 38.213, Version 15.6.0, Jun. 2019, 3GPP Organizational Partners, 107 pages.
CMCC, et al., "R2-1914197: Further discussion on HARQ configuration in NTN," 3GPP TSG-RAN WG2 Meeting 107bis, Oct. 14-18, 2019, Chongqing, China, 5 pages.
Ericsson, "R1-2006465: On HARQ enhancements for NTN," 3GPP TSG-RAN WG1 Meeting #102-e, Aug. 17-28, 2020, Electronic Meeting, 9 pages.
Ericsson, "R2-1913582: DRX adaptions for NTN," 3GPP TSG-RAN WG2 #107bis, Oct. 14-18, 2019, Chongqing, China, 10 pages.
Huawei, "R1-1907652: Feature lead summary of HARQ enhancements for NR-U," 3GPP TSG RAN WG1 Meeting #97, May 13-17, 2019, Reno, Nevada, 22 pages.
Nokia, et al., "R1-1911222: Considerations on HARQ in NTN," 3GPP TSG RAN WG1 Meeting #98bis, Oct. 14-20, 2019, Chongqing, China, 4 pages.
Nokia, et al., "R1-1913019: Considerations on HARQ in NTN," 3GPP TSG RAN WG1 Meeting #99, Nov. 18-22, 2019, Reno, Nevada, 6 pages.
Nokia, et al., "R2-1913388: Discussion on LCP procedure for NTN," 3GPP TSG-RAN WG2 Meeting #107bis, Oct. 14-18, 2019, Chongqing, China, 5 pages.
Thales, "RP-181370: Study on solutions evaluation for NR to support Non Terrestrial Network," 3GPP TSG RAN meeting #80, Jun. 11-14, 2018, La Jolla, California, 5 pages.
Thales, "RP-193234: Solutions for NR to Support non-terrestrial networks (NTN)," 3GPP TSG RAN Meeting #86, Dec. 9-13, 2019, Sitges, Spain, 10 pages.
Examination Report for Indian Patent Application No. 202247025349, mailed Aug. 25, 2022, 6 pages.
Search Report for Japanese Patent Application No. 2022-520579, mailed May 22, 2023, 75 pages.
Notice of Reasons for Refusal for Japanese Patent Application No. 2022-520579, mailed May 29, 2023, 6 pages.
International Search Report and Written Opinion for International Patent Application No. PCT/IB2020/059279, mailed Dec. 11, 2020, 12 pages.
Written Opinion for International Patent Application No. PCT/IB2020/059279, mailed Nov. 23, 2021, 6 pages.
International Preliminary Report on Patentability for International Patent Application No. PCT/IB2020/059279, mailed Mar. 4, 2022, 7 pages.
Non-Final Office Action for U.S. Appl. No. 17/766,408, mailed Sep. 15, 2022, 16 pages.
Notice of Allowance for U.S. Appl. No. 17/766,408, mailed Jan. 23, 2023, 9 pages.
First Office Action for Chinese Patent Application No. 202080083751.8, mailed Aug. 19, 2023, 11 pages.
Corrected Notice of Allowability for U.S. Appl. No. 17/766,408, mailed Jun. 14, 2023, 6 pages.
Mediatek, Inc., "R1-1913369: Summary of 7.2.5.4 on more delay-tolerant re-transmission mechanisms in NR-NTN," 3GPP TSG Ran WG1 Meeting #99, Nov. 18-22, 2019, Reno, Nevada, 15 pages.
Sony, "R1-1912349: Discussion on delay-tolerant HARQ for NTN," 3GPP TSG RAN WG1 Meeting #99, Nov. 18-22, 2019, Reno, Nevada, 6 pages.
Notice of Reasons for Rejection for Japanese Patent Application No. 2023-508552, mailed Apr. 2, 2024, 8 pages.
Mediatek Inc., "R1-1909484: Summary of 7.2.5.4 on more delay-tolerant re-transmission mechanisms in NR-NTN," 3GPP TSG RAN WG1 Meeting #98, Aug. 26-30, 2019, Prague, Czech Republic, 9 pages.
Panasonic, "R1-1908819: HARQ and blind retransmission for NTN," 3GPP TSG RAN WG1 #98, Aug. 26-30, 2019, Prague, Czech Republic, 6 pages.
Request for the Submission of an Opinion for Korean Patent Application No. 10-2022-7014847, mailed Aug. 7, 2024, 13 pages.

* cited by examiner

FIG. 3

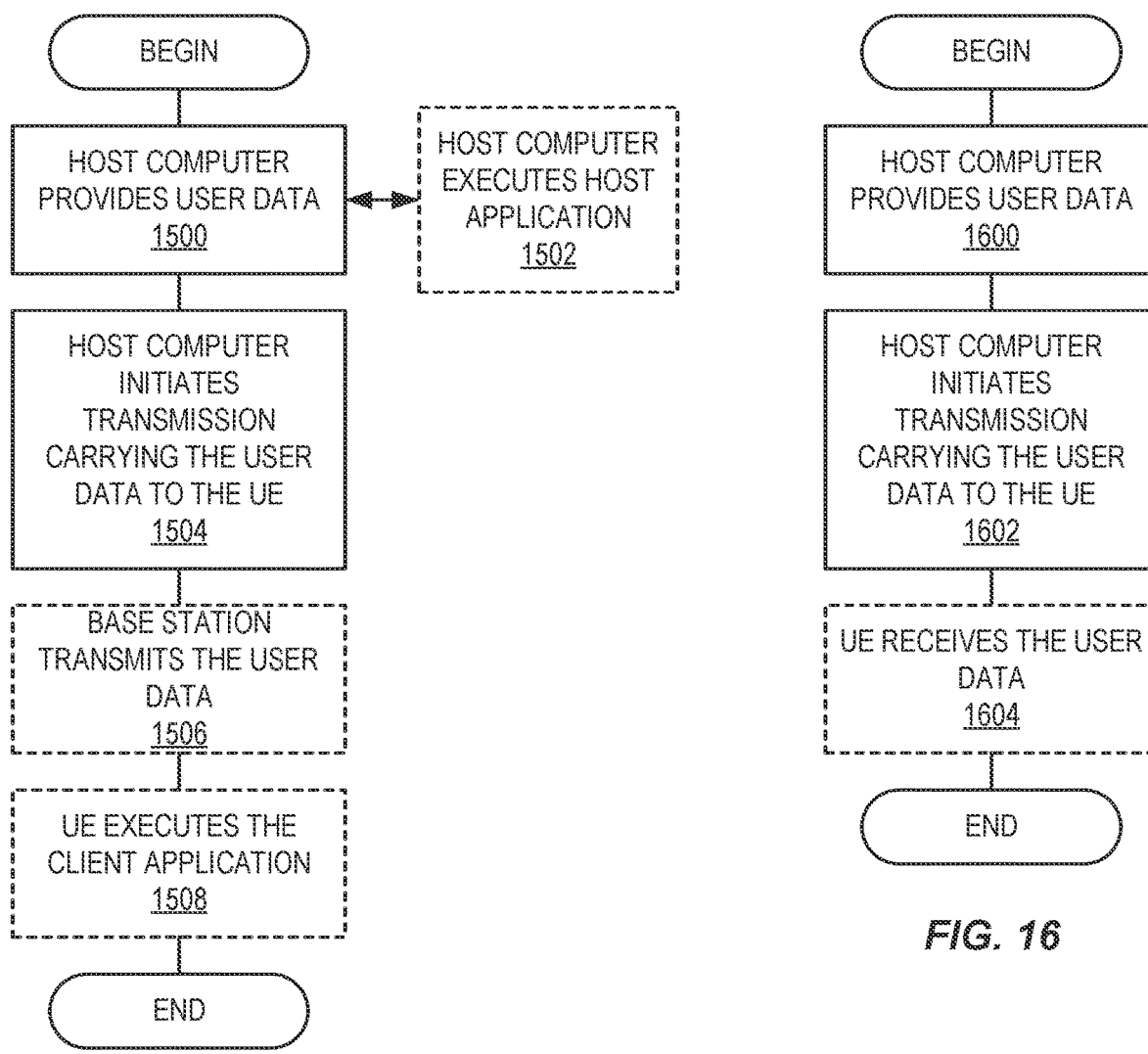

HARQ CODEBOOK CONSTRUCTION WITH FEEDBACK ENABLING/DISABLING PER HARQ PROCESS

RELATED APPLICATIONS

This application is a continuation of U.S. patent application Ser. No. 17/766,408, filed Apr. 4, 2022, now U.S. Pat. No. 11,722,263, which is a 35 U.S.C. § 371 national phase filing of International Application No. PCT/IB2020/059279, filed Oct. 2, 2020, which claims the benefit of provisional patent application Ser. No. 62/910,939, filed Oct. 4, 2019, the disclosures of which are hereby incorporated herein by reference in their entireties.

TECHNICAL FIELD

The present disclosure relates to Hybrid Automatic Repeat Request (HARQ) procedures and, in particular, HARQ codebook generation in a cellular communications system such as, e.g., a Third Generation Partnership Project (3GPP) Fifth Generation (5G) system.

BACKGROUND

In Third Generation Partnership Project (3GPP) Release 15, the first release of the Fifth Generation (5G) System (5GS) was developed. This is a new generation's radio access technology intended to serve use cases such as enhanced Mobile Broadband (eMBB), Ultra-Reliable and Low Latency Communication (URLLC), and massive Machine Type Communication (mMTC). The 5GS includes the New Radio (NR) access stratum interface and the 5G Core Network (5GC). The NR physical and higher layers reuse parts of the Long Term Evolution (LTE) specifications, and to that add needed components when motivated by the new use cases.

In Release 15, 3GPP started the work to prepare NR for operation in a Non-Terrestrial Network (NTN). The work was performed within the study item "NR to support Non-Terrestrial Networks" and resulted in 3GPP Technical Report (TR) 38.811 (see, e.g., V15.1.0). In Release 16, the work to prepare NR for operation in an NTN network continued with the study item "Study on solutions evaluation for NR to support Non-Terrestrial Network" (see RP-181370).

A satellite Radio Access Network (RAN) usually includes the following components:
  A satellite that refers to a space-borne platform.
  An earth-based gateway that connects the satellite to a base station or a core network, depending on the choice of architecture.
  A feeder link that refers to the link between a gateway and a satellite.
  A service link that refers to the link between a satellite and a User Equipment device (UE).

Two popular architectures are the bent pipe transponder architecture and the regenerative transponder architecture. In the first case, the base station is located on Earth behind the gateway, and the satellite operates as a repeater forwarding the feeder link signal to the service link, and vice versa. In the second case, the satellite carries the base station, and the service link connects it to the Earth-based core network.

Depending on the orbit altitude, a satellite may be categorized as a Low Earth Orbit (LEO), Medium Earth Orbit (MEO), or Geostationary Earth Orbit (GEO) satellite.

LEO: typical heights range from 250-1,500 kilometers (km), with orbital periods ranging from 90-120 minutes.
MEO: typical heights range from 5,000-25,000 km, with orbital periods ranging from 3-15 hours.
GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The spotbeam may move over the Earth's surface with the satellite movement or may be Earth fixed with some beam pointing mechanism used by the satellite to compensate for its motion. The size of a spotbeam depends on the system design, which may range from tens of kilometers to a few thousands of kilometers.

Hybrid Automatic Repeat Request (HARQ) protocol is one of the most important features in NR. Together with link adaptation through Channel State Information (CSI) feedback and HARQ Acknowledgement (ACK)/Negative ACK (NACK), HARQ enables efficient, reliable, and low delay data transmission in NR.

Existing HARQ procedures at the physical (PHY)/Medium Access Control (MAC) layer have been designed for terrestrial networks where the Round Trip Time (RTT) propagation delay is usually restricted to within 1 millisecond (ms). With HARQ protocol, a transmitter needs to wait for the feedback from the receiver before sending new data. In case of a NACK, the transmitter may need to resend the data packet. Otherwise, it may send new data. This Stop-and-Wait (SAW) procedure introduces inherent latency to the communication protocol, which may reduce the link throughput. To alleviate this issue, the existing HARQ procedure allows activation of multiple HARQ processes at the transmitter. That is, the transmitter may initiate multiple transmissions in parallel without having to wait for a HARQ completion. For example, with 16 HARQ processes in NR downlink, the NR base station (gNB) may initiate up to 16 new data transmissions without waiting for an ACK/NACK for the first packet transmission. Note that there are a sufficient number of HARQ processes for terrestrial networks where the propagation delay is typically less than 1 ms.

FIG. 1 shows the various delays associated with the HARQ procedure. As illustrated in FIG. 1, the transmitter transmits a packet containing a Physical Downlink Shared Channel (PDSCH) or a Physical Uplink Shared Channel (PUSCH), in this example. The packet first reaches the receiver after a propagation delay (Tp). The receiver sends HARQ ACK/NACK feedback after a processing/slot delay (T1). The feedback reaches the data transmitter after a propagation delay (Tp). The transmitter may send a retransmission or new data after a processing/slot delay (T2). To avoid HARQ stalling, the minimum required number of HARQ processes is ceil((2Tp+T1+T2)/Ts), where Ts refers to the slot duration in NR.

Existing HARQ procedures in NR have largely been designed for terrestrial networks where the propagation delay is typically limited to 1 ms. The main issues with the existing HARQ protocol amid large propagation delays will now be highlighted.

The existing HARQ mechanism may not be feasible when the propagation delay is much larger than that supported by the allowed number of HARQ processes. For example, consider the scenario where NR downlink is to be adopted for satellite communications. For the GEO case, the RTT propagation delay can be around 500 ms. With 16 HARQ processes supported in NR and with a 1 ms slot duration, the available peak throughput as a percentage of the total channel capacity is very low. Table 1 below summarizes the available peak throughput for a UE for LEO, MEO, and GEO satellites. Therefore, without a sufficient number of HARQ processes, the sheer magnitude of the propagation delay may render closed-loop HARQ communication impractical.

The number of HARQ processes supported by the existing HARQ protocol is not sufficient to absorb the potentially large propagation delays in NTNs. For example, Release 15 NR supports a maximum of sixteen (16) HARQ processes in uplink/downlink, and Table 1 shows that a substantial increase in the existing number of HARQ processes is required for operating HARQ amid large propagation delays. Unfortunately, it is challenging to support that many HARQ processes, especially at the UE, due to the following reasons:

a. Supporting many HARQ processes requires a large amount of memory at both the transmitter and the receiver.
b. Supporting many HARQ processes may require reducing the HARQ buffer size and thus the maximum supported Transport Block Size (TBS).
c. Supporting many HARQ processes requires a large number of HARQ buffers, which implies a large number of HARQ receivers.
d. Supporting many HARQ processes may increase the signaling overhead for the HARQ process Identity (ID). In NR, the HARQ process ID is indicated in the Downlink Control Information (DCI), and currently there are four (4) bits in the HARQ process number field to indicate the HARQ process ID. Increasing the number of HARQ processes to, e.g., 500 would require around nine (9) bits, which is more than double the current four (4) bits in the HARQ process number field.

TABLE 1

Required number of HARQ processes in satellite networks. The peak throughput with 16 HARQ processes and Ts = 1 ms is also listed.

| Satellite | Total delay | Reqd. # HARQ processes | Available peak throughput (% of peak capacity) |
| --- | --- | --- | --- |
| LEO | ~50 ms | ~50 | ~32% |
| MEO | ~180 ms | ~180 | ~8.9% |
| GEO | ~600 ms | ~600 | ~2.7% |

In order to adapt HARQ to NTNs, one solution is to semi-statically enable/disable HARQ feedback. To this end, the following agreements were made in RAN2 #107:

Agreements
- It should be possible to enabled / disabled HARQ feedback semi-statically by RRC signalling
- The enabling / disabling of HARQ feedback should be configurable on a per UE and per HARQ process basis According to the above agreement, there is no feedback for transmission if HARQ is disabled. Furthermore, according to the above agreement, a UE can be configured with a mixture of both feedback disabled HARQ processes and feedback enabled HARQ processes as the configuration is on a per UE and per HARQ process basis.

In regard to NR HARQ ACK/NACK feedback over a Physical Uplink Control Channel (PUCCH), when receiving a PDSCH in the downlink from a serving gNB at slot n, a UE feeds back a HARQ ACK at slot n+k over a PUCCH resource in the uplink to the gNB if the PDSCH is decoded successfully. Otherwise, the UE sends a HARQ NACK at slot n+k to the gNB to indicate that the PDSCH is not decoded successfully. For DCI format 1-0, k is indicated by a 3-bit PDSCH-to-HARQ-timing-indicator field. For DCI format 1-1, k is indicated either by a 3-bit PDSCH-to-HARQ-timing-indicator field, if present, or by higher layers through Radio Resource Control (RRC) signaling.

If Code Block Group (CBG) transmission is configured, a HARQ ACK/NACK for each CBG in a Transport Block (TB) is reported. In case of Carrier Aggregation (CA) with multiple carriers and/or Time Division Duplexing (TDD) operation, multiple aggregated HARQ ACK/NACK bits are sent in a single PUCCH.

In NR, up to four PUCCH resource sets can be configured to a UE. A PUCCH resource set with pucch-ResourceSetId=0 can have up to thirty-two (32) PUCCH resources, while for PUCCH resource sets with pucch-ResourceSetId=1 to 3, each set can have up to eight (8) PUCCH resources. A UE determines the PUCCH resource set in a slot based on the number of aggregated Uplink Control Information (UCI) bits to be sent in the slot. The UCI bits consist of HARQ ACK/NACK, Scheduling Request (SR), and CSI bits.

If the UE transmits Om UCI information bits, the UE determines a PUCCH resource set to be:

a first set of PUCCH resources with pucch-ResourceSetId=0 if $O_{UCI} \le 2$ including one (1) or two (2) HARQ-ACK information bits and a positive or negative SR on one SR transmission occasion if transmission of HARQ-ACK information and SR occur simultaneously, or a second set of PUCCH resources with pucch-ResourceSetId=1, if provided by higher layers, if $2<O_{UCI} \le N_2$, or a third set of PUCCH resources with pucch-ResourceSetId=2, if provided by higher layers, if $N_2<O_{UCI} \le N_3$, or a fourth set of PUCCH resources with pucch-ResourceSetId=3, if provided by higher layers, if $N_3<O_{UCI} \le 1706$.

where $N_1<N_2<N_3$ are provided by higher layers.

For a PUCCH transmission with HARQ-ACK information, a UE determines a PUCCH resource after determining a PUCCH resource set. The PUCCH resource determination is based on a 3-bit PUCCH Resource Indicator (PRI) field in DCI format 1_0 or DCI format 1_1. If more than one DCI format 1_0 or 1_1 is received in the case of CA and/or TDD, the PUCCH resource determination is based on a PRI field in the last DCI format 1_0 or DCI format 1_1 among the multiple received DCI format 1_0 or DCI format 1_1 that the UE detects.

NR Release 15 supports two types of HARQ codebooks, i.e. semi-static (Type-1) codebooks and dynamic (Type-2) codebooks, for HARQ ACK/NACK multiplexing for multiple PDSCHs of one or more Component Carriers (CCs). A UE can be configured to use either one of the codebooks for HARQ ACK/NACK feedback.

NR Type-1 HARQ-ACK Codebook Determination

In regarding to NR Type-1 HARQ-ACK codebook determination, the HARQ codebook size in time (downlink association set) is determined based on the configured set of HARQ-ACK timings K1 and a semi-static configured TDD pattern in case of TDD. For a Physical Downlink Control Channel (PDCCH) received in slot n for a PDSCH, K1 is signaled in the PDCCH and indicates that the HARQ ACK/NACK feedback for the PDSCH occurs in slot n+K1.

FIG. 2 shows an example of Type-1 HARQ codebook with K1={1,2,3,4,5} and a single PDSCH per slot. In other words, FIG. 2 shows an example for a TDD pattern with a set of K1 from 1 to 5 and a configured time domain resource allocation table or the pc/sch-TimeDomainAllocationList without non-overlapping PDSCH Time Domain Resource Assignment (TDRA) allocation, i.e., only one PDSCH can be scheduled in a slot. In this case, there are five (5) entries in the HARQ codebook, one for each K1 value. For slots without PDSCH transmission or for slots where there is no PDSCH detected, the corresponding entry in the codebook is filled with NACK.

If the UE supports reception of more than one unicast PDSCH per slot, one HARQ codebook entry for each non-overlapping time domain resource allocation in the pdsch-symbolAllocation table is reserved per slot; otherwise, one HARQ entry is reserved per slot.

In regard to NR Type-2 HARQ-ACK codebook determination, unlike Type-1 HARQ codebook, the size of the Type-2 HARQ codebook changes dynamically based on the number of DCIs scheduling PDSCH receptions or Semi-Persistent Scheduling (SPS) PDSCH release that are associated with a same PUCCH resource for HARQ ACK/NACK feedback. The number of DCIs can be derived based a counter Downlink Assignment Indicator (DAI) field in the DCIs and, in case of DCI format 1-1, also a total DAI field if more than one serving cell is configured for the UE.

A value of the counter DAI field in DCI format 1_0 or DCI format 1_1 denotes the accumulative number of {serving cell, PDCCH monitoring occasion}-pair(s) in which PDSCH reception(s) or SPS PDSCH release associated with DCI format 1_0 or DCI format 1_1 is present, up to the current serving cell and current PDCCH monitoring occasion. The value of the total DAI, when present, in DCI format 1_1 denotes the total number of {serving cell, PDCCH monitoring occasion}-pair(s) in which PDSCH reception(s) or SPS PDSCH release associated with DCI format 1_0 or DCI format 1_1 is present, up to the current PDCCH monitoring occasion m and is updated from PDCCH monitoring occasion to PDCCH monitoring occasion.

An example is shown FIG. 3, where a UE is configured with two (2) serving cells and four (4) PDCCH monitoring occasions. Each scheduled DCI is shown via a filled box, and the corresponding counter DAI and total DAI values after each scheduled DCI are denoted as (counter DAI, total DAI). The counter DAI is updated after every scheduled DCI while total DAI is only updated every monitoring occasion. Since only two (2) bits are allocated for either counter DAI or total DAI in DCI, the actual DAI values are wrapped round with a modulo 4 operation. A UE can determine the actual number of DCIS transmitted even though some DCIS are undetected, if the undetected consecutive DCIS are smaller than four (4).

For DCI format 1-1, the DAI field is only present when the Type-2 HARQ-ACK is used and bitwidths of 0, 2, or 4 bits are possible. For DCI format 1-0, the DAI field is composed of two (2) bits.

The DAI field may be present in DCI format 0_1 for handling of HARQ codebooks in case of UCI transmitted on PUSCH.

First DAI: one (1) bit for Type-1 HARQ-ACK codebook and two (2) bits for Type-2 HARQ-ACK codebook.

Second DAI: two (2) bits for Type-2 HARQ-ACK codebook with two (2) HARQ-ACK sub-codebooks; zero (0) bits otherwise.

There currently exist certain challenge(s). With the UE being configured with both feedback disabled HARQ processes and feedback enabled HARQ processes, UE procedures related to Type-2 HARQ codebooks is still undefined, which is a problem that needs to be solved.

SUMMARY

Systems and methods are disclosed herein that relate to dynamic Hybrid Automatic Repeat Request (HARQ) codebook construction with enabling or disabling of HARQ Acknowledgment (HARQ-ACK) feedback per HARQ process. Embodiments of a method performed by a wireless communication device are disclosed. In one embodiment, a method performed by a wireless communication device for dynamic codebook based HARQ-ACK feedback comprises receiving, from a network node, information that configures the wireless communication device with a first set of HARQ processes for which HARQ-ACK feedback is disabled and a second set of HARQ processes for which HARQ-ACK feedback is enabled. The method further comprises receiving first downlink control information that schedules a first downlink shared channel transmission to the wireless communication device and determining that the first downlink shared channel transmission corresponds to one of the first set of HARQ processes for which HARQ-ACK feedback is disabled. The method further comprises, upon determining that the first downlink shared channel transmission corresponds to one of the first set of HARQ processes for which HARQ-ACK feedback is disabled, performing a first set of actions for HARQ-ACK feedback generation for HARQ processes with HARQ-ACK feedback disabled. In this manner, wireless communication device behavior when configured with both enabled and disabled HARQ processes is defined.

In one embodiment, receiving the information that configures the wireless communication device with the first set of HARQ processes for which HARQ-ACK feedback is disabled and the second set of HARQ processes for which HARQ-ACK feedback is enabled comprises receiving the information via Radio Resource Control (RRC) signaling.

In one embodiment, the first set of actions is different than a second set of actions for HARQ-ACK feedback generation for HARQ processes with HARQ-ACK feedback enabled.

In one embodiment, the first set of actions comprises one or more of the following actions: assuming that a counter Downlink Assignment Indicator (DAI) comprised in the first downlink control information is not incremented for the first downlink shared channel transmission, assuming that a total DAI comprised in the first downlink control information is not incremented for the first downlink shared channel transmission, ignoring the counter DAI and the total DAI comprised in the first downlink control information, or refraining from generating HARQ-ACK feedback for the first downlink shared channel transmission such that a size of a dynamic codebook comprising HARQ-ACK feedback is not impacted by the first downlink shared channel transmission.

In one embodiment, the method further comprises receiving second downlink control information that schedules second downlink shared channel transmission to the wireless communication device and determining that the second downlink shared channel transmission corresponds to one of the second set of HARQ processes for which HARQ-ACK feedback is enabled. The method further comprises, upon determining that the second downlink shared channel transmission corresponds to one of the second set of HARQ processes for which HARQ-ACK feedback is enabled, performing a second set of actions for HARQ-ACK feedback generation for HARQ processes with HARQ-ACK feedback enabled, wherein the second set of actions is different than the first set of actions. In one embodiment, the second set of actions comprises one or more of the following actions: assuming that a counter DAI comprised in the second downlink control information is incremented for the second downlink shared channel transmission, assuming that a total DAI comprised in the second downlink control information is incremented for the second downlink shared channel transmission, or generating HARQ-ACK feedback for the second downlink shared channel transmission.

In one embodiment, the method further comprises sending HARQ-ACK feedback to a network node, the HARQ-ACK feedback comprising HARQ-ACK feedback for the second downlink shared channel transmission. In one embodiment, sending the HARQ-ACK feedback to the network node comprises generating a HARQ-ACK codebook comprising HARQ-ACK feedback for a plurality of physical downlink shared channel transmissions where the HARQ-ACK codebook comprising HARQ-ACK feedback for the second downlink shared channel transmission, determining a physical uplink control channel resource for sending the HARQ-ACK codebook based on a physical uplink control channel resource indicator in a last downlink control information received and decoded for a physical downlink shared channel transmission for which HARQ-ACK feedback is comprised in the HARQ-ACK codebook, and sending the HARQ-ACK codebook to a network node on the determined physical uplink control channel resource. In one embodiment, the HARQ-ACK codebook is a dynamic codebook.

Corresponding embodiments of a wireless communication device are also disclosed. In one embodiment, a wireless communication device for dynamic codebook based HARQ-ACK feedback is adapted to receive, from a network node, information that configures the wireless communication device with a first set of HARQ processes for which HARQ-ACK feedback is disabled and a second set of HARQ processes for which HARQ-ACK feedback is enabled. The wireless communication device is further adapted to receive first downlink control information that schedules a first downlink shared channel transmission to the wireless communication device and determine that the first downlink shared channel transmission corresponds to one of the first set of HARQ processes for which HARQ-ACK feedback is disabled. The wireless communication device is further adapted to, upon determining that the first downlink shared channel transmission corresponds to one of the first set of HARQ processes for which HARQ-ACK feedback is disabled, perform a first set of actions for HARQ-ACK feedback generation for HARQ processes with HARQ-ACK feedback disabled.

In one embodiment, a wireless communication device for dynamic codebook based HARQ-ACK feedback comprises one or more transmitters, one or more receivers, and processing circuitry associated with the one or more transmitters and the one or more receivers. The processing circuitry is configured to cause the wireless communication device to receive, from a network node, information that configures the wireless communication device with a first set of HARQ processes for which HARQ-ACK feedback is disabled and a second set of HARQ processes for which HARQ-ACK feedback is enabled. The processing circuitry is further configured to cause the wireless communication device to receive first downlink control information that schedules a first downlink shared channel transmission to the wireless communication device and determine that the first downlink shared channel transmission corresponds to one of the first set of HARQ processes for which HARQ-ACK feedback is disabled. The processing circuitry is further configured to cause the wireless communication device to, upon determining that the first downlink shared channel transmission corresponds to one of the first set of HARQ processes for which HARQ-ACK feedback is disabled, perform a first set of actions for HARQ-ACK feedback generation for HARQ processes with HARQ-ACK feedback disabled.

Embodiments of a method performed by a network node are also disclosed. In one embodiment, a method performed by a network node that implements at least some functionality of a base station for dynamic codebook based HARQ-ACK feedback comprises configuring a wireless communication device with a first set of HARQ processes for which HARQ-ACK feedback is disabled and a second set of HARQ processes for which HARQ-ACK feedback is enabled. The method further comprises generating first downlink control information that schedules a first downlink shared channel transmission to the wireless communication device, where the first downlink shared channel transmission corresponds to one of the first set of HARQ processes for which HARQ-ACK feedback is disabled. Generating the first downlink control information comprises generating the first downlink control information in accordance with a first set of rules for HARQ processes with HARQ-ACK feedback disabled. The method further comprises transmitting or initiating transmission of the first downlink control information to the wireless communication device.

In one embodiment, the first set of rules is different than a second set of rules for HARQ processes with HARQ-ACK feedback enabled.

In one embodiment, the method further comprises generating second downlink control information that schedules a second downlink shared channel transmission to the wireless communication device, where the second downlink shared channel transmission corresponds to one of the second set of HARQ processes for which HARQ-ACK feedback is enabled. Generating the second downlink control information comprises generating the second downlink control information in accordance with a second set of rules for HARQ processes with HARQ-ACK feedback enabled, the second set of rules being different than the first set of rules. The method further comprises transmitting or initiating transmission of the second downlink control information to the wireless communication device.

In one embodiment, the second set of rules comprises one or more of the following rules: a rule that a counter DAI comprised in the second downlink control information is incremented for the second downlink shared channel transmission, a rule that a total DAI comprised in the second downlink control information is incremented for the second downlink shared channel transmission, or a rule that a size of a dynamic codebook comprising HARQ-ACK feedback is impacted by the second downlink shared channel transmission.

In one embodiment, the first set of rules comprises one or more of the following rules: a rule that a counter DAI comprised in the first downlink control information is not incremented for the first downlink shared channel transmission, a rule that a total DAI comprised in the first downlink control information is not incremented for the first downlink shared channel transmission, a rule that the counter DAI comprised in the first downlink control information can be ignored by the wireless communication device, or a rule that a size of a dynamic codebook comprising HARQ-ACK feedback is not impacted by the first downlink shared channel transmission.

Corresponding embodiments of a network node are also disclosed. In one embodiment, a network node that implements at least some functionality of a base station for dynamic codebook based HARQ-ACK feedback is adapted to configure a wireless communication device with a first set of HARQ processes for which HARQ-ACK feedback is disabled and a second set of HARQ processes for which HARQ-ACK feedback is enabled. The network node is further adapted to generate first downlink control information that schedules a first downlink shared channel transmission to the wireless communication device, where the first downlink shared channel transmission corresponding to one of the first set of HARQ processes for which HARQ-ACK feedback is disabled. The first downlink control information is generated in accordance with a first set of rules for HARQ processes with HARQ-ACK feedback disabled. The network node is further adapted to transmit or initiate transmission of the first downlink control information to the wireless communication device.

In one embodiment, a network node that implements at least some functionality of a base station for dynamic codebook based HARQ-ACK feedback comprises processing circuitry configured to cause the network node to configure a wireless communication device with a first set of HARQ processes for which HARQ-ACK feedback is disabled and a second set of HARQ processes for which HARQ-ACK feedback is enabled. The processing circuitry is further configured to cause the network node to generate first downlink control information that schedules a first downlink shared channel transmission to the wireless communication device, where the first downlink shared channel transmission corresponding to one of the first set of HARQ processes for which HARQ-ACK feedback is disabled. The first downlink control information is generated in accordance with a first set of rules for HARQ processes with HARQ-ACK feedback disabled. The processing circuitry is further configured to cause the network node to transmit or initiate transmission of the first downlink control information to the wireless communication device.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates an example of the counter Downlink Assignment Indicator (DAI) and the total DAI for a scenario in which a User Equipment (UE) is configured with two serving cells and four Physical Downlink Control Channel (PDCCH) monitoring occasions;

FIGS. 15 and 16 are flow charts that illustrate example embodiments of methods implemented in a communication system such as that of FIG. 13.

DETAILED DESCRIPTION

Figure 1:
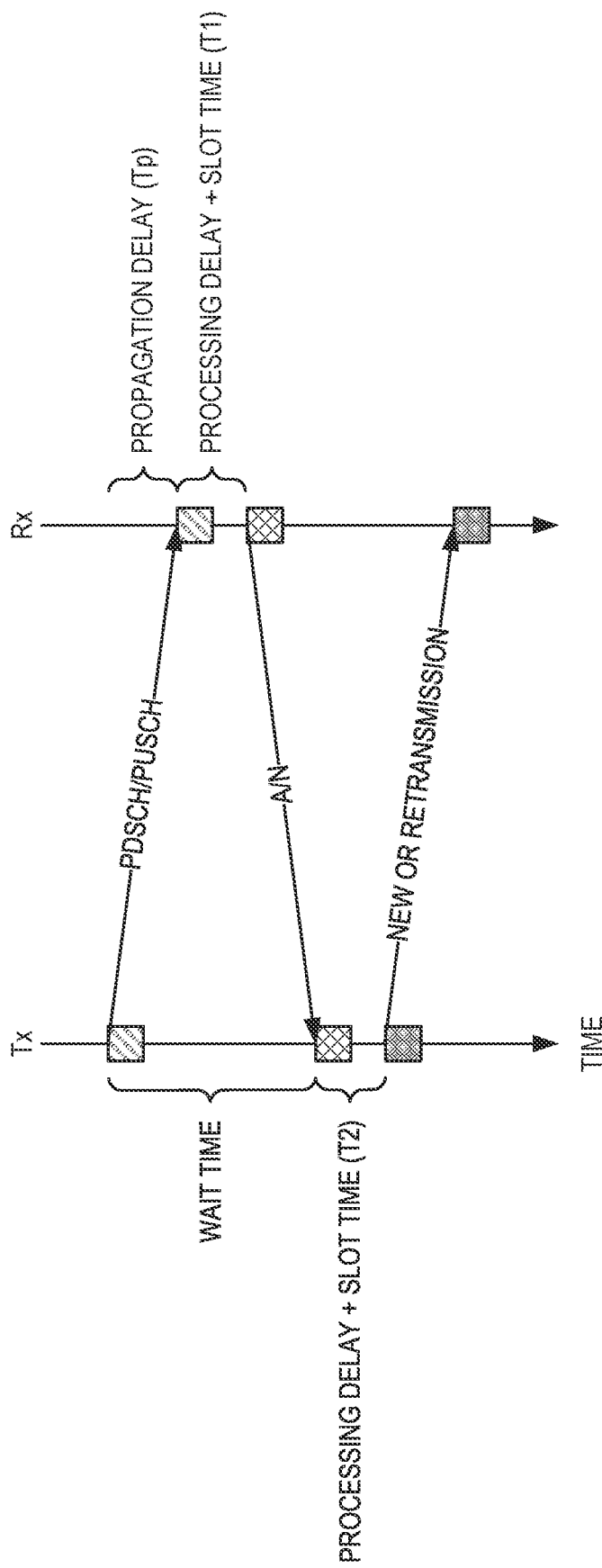
FIG. 1 shows various delays associated with the Hybrid Automatic Repeat Request (HARQ) procedure specified in Release 15 of Third Generation Partnership Project (3GPP) New Radio (NR)
Figure 2:
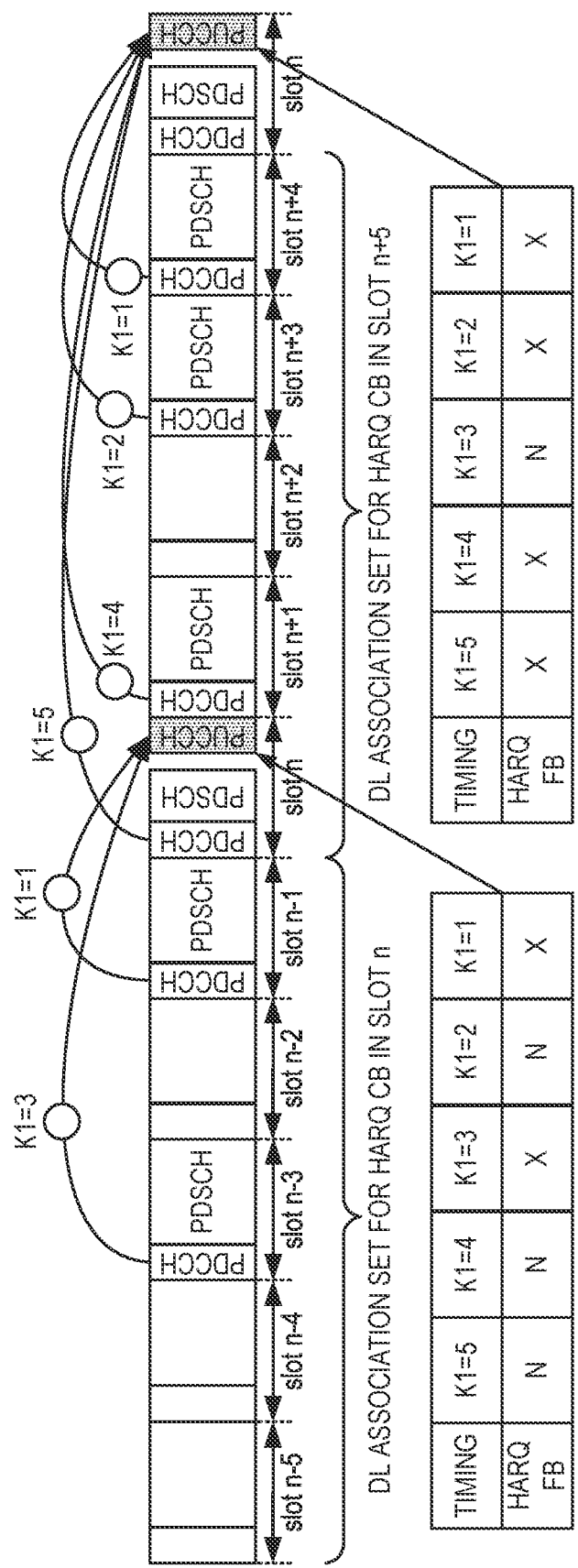
FIG. 2 shows an example of Type-1 HARQ codebook with K1={1,2,3,4,5} and a single Physical Downlink Shared Channel (PDSCH) per slot.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) in relation to current Hybrid Automatic Repeat Request (HARQ) procedures, particularly those defined in 3GPP NR. With a UE being configured with both feedback disabled HARQ processes and feedback enabled HARQ processes, the UE procedures related to Type-2 HARQ codebooks is still undefined, which is a problem that needs to be solved.

Certain aspects of the present disclosure and their embodiments may provide solutions to some or all of the aforementioned or other challenges. The proposed solution defines the HARQ codebook construction for a UE which is configured with both feedback disabled HARQ processes and feedback enabled HARQ processes. Embodiments of the proposed solution include one or more of the following aspects:

The Type-2 HARQ codebook construction is dependent on whether the UE is scheduled with a Physical Downlink Shared Channel (PDSCH) that is associated with a feedback-enabled HARQ process or not.
  The counter Downlink Assignment Indicator (DAI) indicated in the Downlink Control Information (DCI) is only incremented if the scheduled PDSCH is associated with a feedback-enabled HARQ process. Otherwise, the counter DAI is not incremented.
  The total DAI, if indicated in the DCI, is only incremented if the scheduled PDSCH is associated with a feedback-enabled HARQ process. Otherwise, the total DAI is not incremented.
  The Physical Uplink Control Channel (PUCCH) resource for sending the HARQ Acknowledgement (ACK)/ Negative ACK (NACK) feedback is determined based on the PUCCH resource indicator field in the last DCI that scheduled a PDSCH associated with a feedback-enabled HARQ process.
  Feed back HARQ ACK/NACK for the PDSCH corresponding to the feedback-enabled HARQ process takes into account counter DAI and total DAI fields indicated in DCI.

There are, proposed herein, various embodiments which may address one or more of the issues disclosed herein. Some example embodiments are as follows. In a first embodiment, a method of constructing a HARQ codebook in a wireless communication device (e.g., a UE) is provided. The method involves one or more of the following steps: (a) the wireless communication device receives configuration information (e.g., from a network node (e.g., a gNB)) of a HARQ ACK/NACK feedback enabling/disabling on a per HARQ process basis with a first subset of HARQ processes that have HARQ ACK/NACK feedback enabled and a second subset of HARQ processes that have HARQ ACK/NACK feedback disabled, (b) the wireless communication device determines whether a HARQ process indicated in a DCI that schedules a PDSCH has HARQ ACK/NACK feedback enabled or not, (c) the wireless communication device constructs a HARQ codebook based on whether the HARQ process indicated in the DCI that schedules the PDSCH has HARQ ACK/NACK feedback enabled or not, (d) the wireless communication device determines the PUCCH resource for sending the HARQ ACK/NACK feedback based on the PUCCH resource indicator field in a last DCI, and (e) the wireless communication devices feeds back HARQ ACK/NACK based on the constructed HARQ codebook.

In a second embodiment, the HARQ codebook of the first embodiment is a dynamic HARQ codebook of Type-1.

In a third embodiment, the construction of the HARQ codebook of any of the first and second embodiments includes a counter DAI indicated in the DCI is assumed not to be incremented by the wireless device if the HARQ process indicated in the DCI has HARQ ACK/NACK feedback disabled.

In another embodiment, the construction of the HARQ codebook in any of the first and second embodiments includes a counter DAI indicated in the DCI is not to be incremented by the network node if the HARQ process indicated in the DCI has HARQ ACK/NACK feedback disabled.

In a fourth embodiment, the construction of the HARQ codebook of any of the first and second embodiments includes a counter DAI indicated in the DCI is assumed to be incremented by the wireless device if the HARQ process indicated in the DCI has HARQ ACK/NACK feedback enabled.

In another embodiment, the construction of the HARQ codebook of any of the first and second embodiments includes a counter DAI indicated in the DCI has been incremented by the network node if the HARQ process indicated in the DCI has HARQ ACK/NACK feedback enabled.

In a fifth embodiment, in any of the first through fourth embodiments, the construction of the HARQ codebook includes a total DAI indicated in the DCI is assumed not to be incremented by the wireless device if the HARQ process indicated in the DCI has HARQ ACK/NACK feedback disabled.

In another embodiment, in any of the first through fourth embodiments, the construction of the HARQ codebook includes a total DAI indicated in the DCI has not been incremented by the network node if the HARQ process indicated in the DCI has HARQ ACK/NACK feedback disabled.

In a sixth embodiment, in any of the first and second embodiments, the construction of the HARQ codebook includes a total DAI indicated in the DCI is assumed to be incremented by the wireless device if the HARQ process indicated in the DCI has HARQ ACK/NACK feedback enabled.

In another embodiment, in any of the first and second embodiments, the construction of the HARQ codebook includes a total DAI indicated in the DCI has been incremented by the network node if the HARQ process indicated in the DCI has HARQ ACK/NACK feedback enabled.

In a seventh embodiment, in any of the first through sixth embodiments, the last DCI (in item d of the first embodiment above) is a DCI where the HARQ process indicated in the DCI has HARQ ACK/NACK feedback enabled.

Certain embodiments may provide one or more of the following technical advantage(s). Embodiments of the present disclosure define the UE procedures with regard to Type-2 HARQ codebook for the case when a UE is configured with both feedback disabled HARQ processes and feedback-enabled HARQ processes, which are currently not known in the state of the art. Furthermore, the HARQ feedback overhead can also be reduced with the proposed solution as the codebook size only takes into account PDSCHs associated with a feedback-enabled HARQ process.

Figure 4:
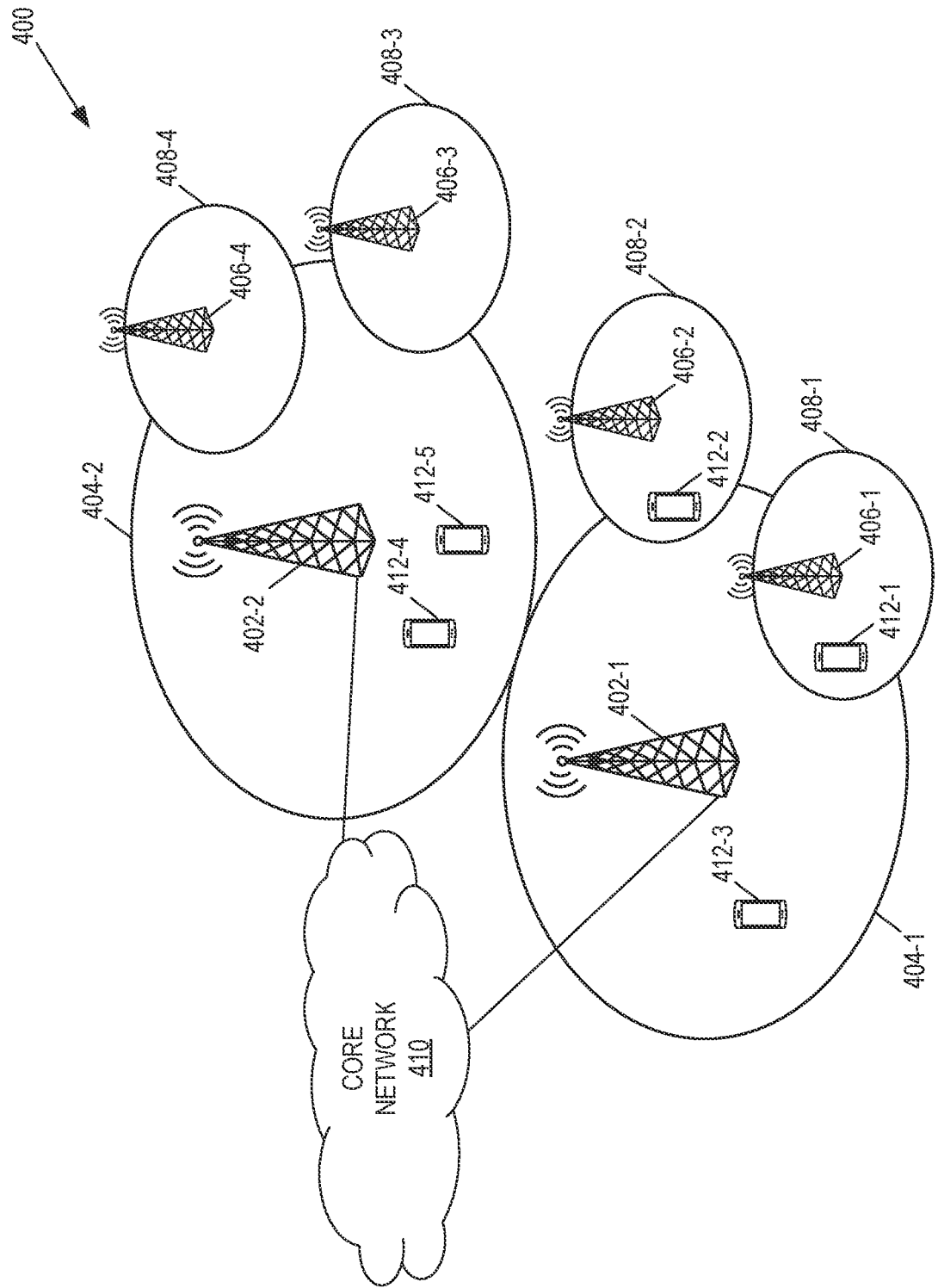
FIG. 4 illustrates one example of a cellular communications system in which embodiments of the present disclosure may be implemented.

In this regard, FIG. 4 illustrates one example of a cellular communications system 400 in which embodiments of the present disclosure may be implemented. In the embodiments described herein, the cellular communications system 400 is a 5G System (5GS) including a Next Generation RAN (NG-RAN), which is also referred to herein as a NR RAN. In this example, the RAN includes base stations 402-1 and 402-2, which in 5G NR are referred to as gNBs or next generation eNBs (ng-eNBs) (e.g., ng-eNBs are LTE RAN nodes connected to the 5G Core Network (5GC)), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Figure 5:
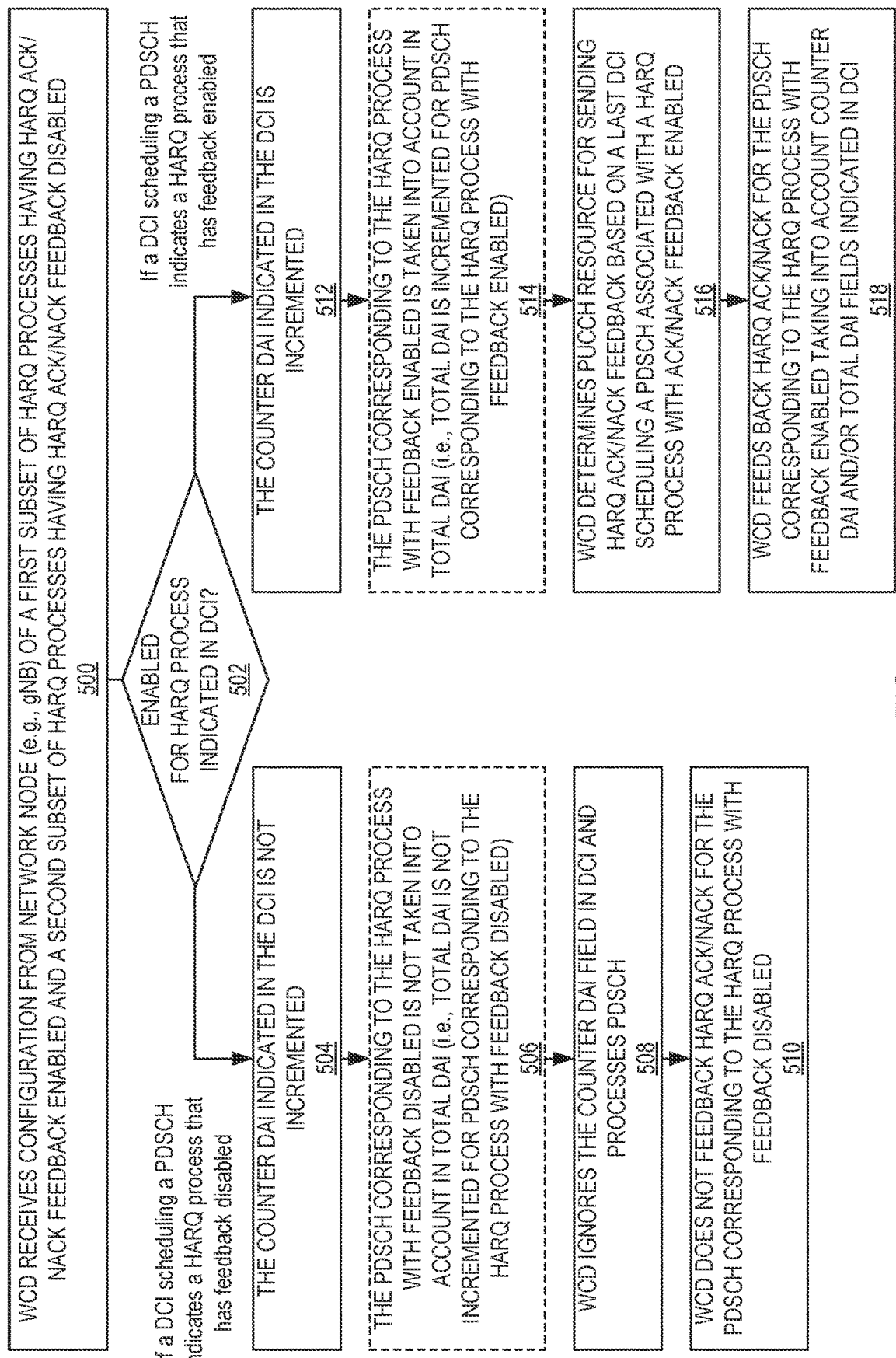
FIG. 5 is a flow chart that illustrates the operation of a Wireless Communication Device (WCD) (e.g., a UE) in accordance with some embodiments of the present disclosure.

The proposed solution defines a HARQ codebook construction for a wireless communication device 412 (e.g., a UE), where the wireless communication device 412 is configured with both: (a) one or more feedback disabled HARQ processes and (b) one or more feedback enabled HARQ processes. In this regard, FIG. 5 is a flow chart that illustrates the operation of a Wireless Communication Device (WCD) 412 (e.g., a UE) in accordance with some embodiments of the present disclosure. Optional steps are represented with dashed boxes/lines.

As illustrated in FIG. 5, in step 500, the WCD 412 (e.g., a UE) receives a higher layer configuration from a network node (e.g., a base station 402 such as, e.g., a gNB) of HARQ ACK/NACK feedback enabling or disabling on a per HARQ process basis. Hence, the WCD 412 can be configured with (i.e., be using) one subset (referred to herein as a "first subset" or "first set") of HARQ processes that have HARQ ACK/NACK feedback enabled and another subset (referred to herein as a "second subset" or "second set") of HARQ processes that have HARQ ACK/NACK feedback disabled.

In step 502, the WCD 412 determines whether a HARQ process indicated in a DCI that schedules a PDSCH has HARQ ACK/NACK feedback enabled or not. This can be determined by the WCD 412 by checking if the 'HARQ process number' field in the DCI points to a feedback enabled HARQ process or a feedback disabled HARQ process. Depending on this determination, the WCD 412 follows different procedures with respect to HARQ ACK/NACK feedback with Type-2 HARQ ACK codebook.

If the WCD 412 determines that the DCI scheduling the PDSCH indicates a HARQ process that has feedback disabled, then according to one embodiment, one or more of the following actions or procedures are performed:

Step 504: The counter DAI indicated in the DCI is assumed not to be incremented as there is no HARQ ACK/NACK feedback for this scheduled PDSCH. That is, counter DAI is not incremented by the network node (e.g., gNB) for the PDSCH corresponding to the HARQ process with feedback disabled.

Step 506: If the total DAI field is present in the DCI, the PDSCH corresponding to the HARQ process with feedback disabled is assumed not to be taken into account in total DAI indicated in the DCI. That is, total DAI is not incremented by the network node (e.g., gNB) for the PDSCH corresponding to the HARQ process with feedback disabled.

Step 508: The WCD 412 ignores the counter DAI and total DAI (if present) fields in the DCI and proceeds to process PDSCH. In an alternative embodiment, the total DAI (if present) carries the correct value (i.e., number of Physical Downlink Control Channel (PDCCH) scheduling HARQ-enabled PDSCH up to the current PDCCH monitoring occasion) and is not ignored by the WCD 412.

Step 510: Regardless of the outcome of the PDSCH decoding, the WCD 412 does not feedback HARQ ACK/NACK for the PDSCH corresponding to the HARQ process with feedback disabled. In other words, when generating the HARQ feedback for sending to the network node (e.g., gNB), the WCD 412 does not include a HARQ ACK/NACK for the PDSCH scheduled by the DCI that indicated that HARQ process with feedback disabled.

If the WCD 412 determines that the DCI scheduling the PDSCH indicates a HARQ process that has feedback enabled, then according to one embodiment, one or more of the following actions or procedures are performed:

Step 512: The counter DAI indicated in the DCI is assumed to incremented as there will be HARQ ACK/NACK feedback for this scheduled PDSCH. That is, counter DAI is incremented by the network node (e.g., gNB) for the PDSCH corresponding to the HARQ process with feedback enabled.

Step 514: If the total DAI field is present in the DCI, the PDSCH corresponding to the HARQ process with feedback enabled is assumed to be taken into account in total DAI indicated in the DCI. That is, total DAI is incremented by the network node (e.g., gNB) for the PDSCH corresponding to the HARQ process with feedback enabled.

Step 516: The WCD 412 determines the PUCCH resource for sending the HARQ ACK/NACK feedback based on the PUCCH resource indicator field in the last DCI that scheduled a PDSCH associated with a HARQ process with ACK/NACK feedback enabled.

Step 518: The WCD 412 feeds back HARQ ACK/NACK for the PDSCH corresponding to the HARQ process with feedback enabled taking into account counter DAI and total DAI fields indicated in DCI. In other words, when generating the HARQ feedback for sending to the network node (e.g., gNB), the WCD 412 does include a HARQ ACK/NACK for the PDSCH scheduled by the DCI that indicated that HARQ process with feedback disabled.

In some embodiments, steps 502-518 are repeated for a number of received DCIs scheduling respective PDSCHs. At some point, either at a time indicated by the PDSCH-to-ACK feedback timing or when dynamically triggered by the network node (e.g., gNB), the WCD 412 sends a HARQ report including the generated HARQ feedback to the network node. As discussed above, this HARQ feedback includes HARQ ACK/NACK bits for the PDSCHs that correspond to HARQ processes with feedback enabled and does not include HARQ ACK/NACK bits for PDSCHs that correspond to HARQ processes with feedback disabled. Further, in some embodiments, when determining the HARQ ACK/NACK bits to feed back, the WCD 412 may take into account the counter DAI and/or the total DAI values (which are updated based on whether the corresponding PDSCH transmissions correspond to HARQ processes that have HARQ feedback disabled or enabled) (e.g., to identify when PDSCH transmissions have been missed).

Figure 3:
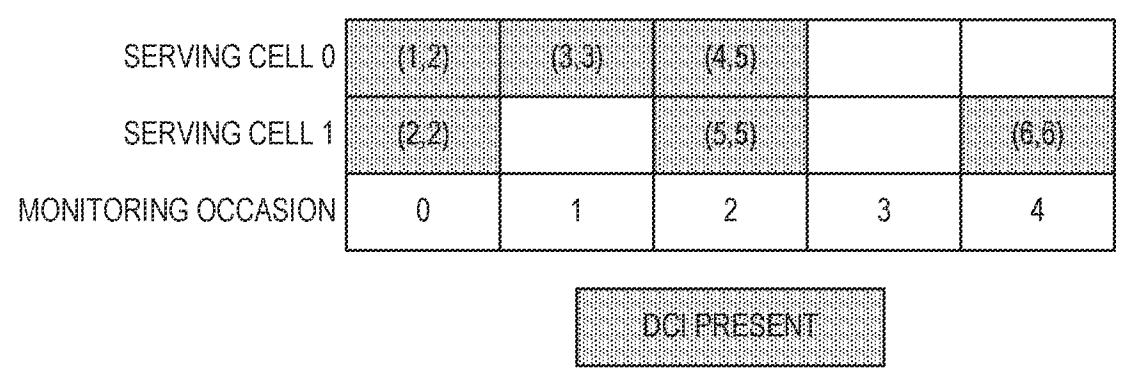
Figure 6:
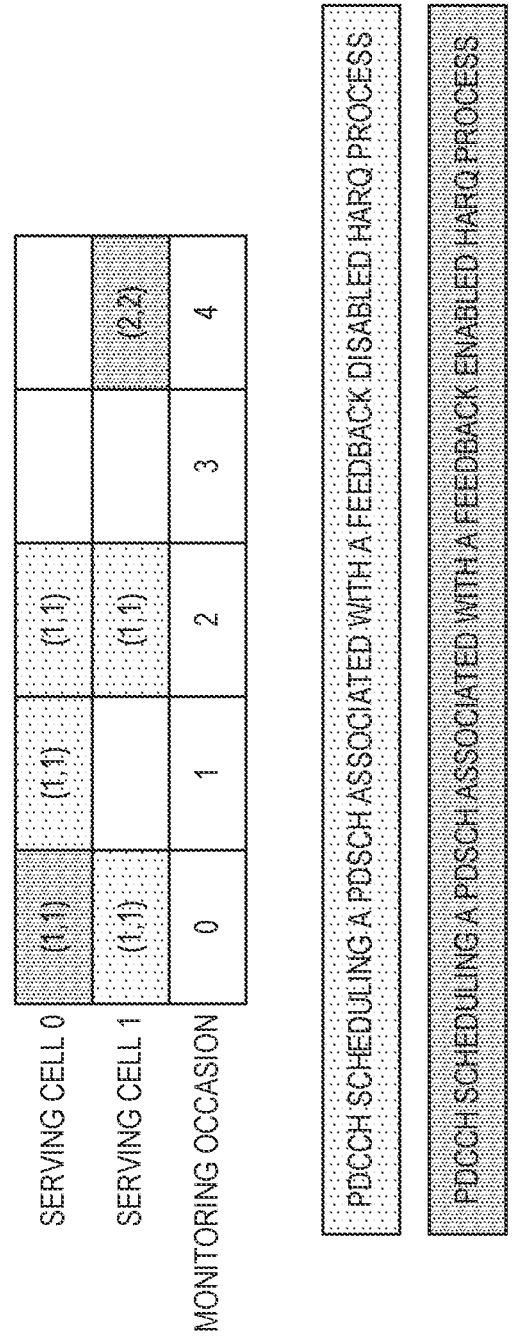
FIG. 6 is an example illustration of an embodiment of the present disclosure in which a UE is configured with two (2) serving cells and four (4) PDCCH monitoring occasions.

An example illustrating an embodiment of the proposed solution is shown in FIG. 6, where a UE is configured with two (2) serving cells and four (4) PDCCH monitoring occasions. Each scheduled DCI is shown via a filled box, and the corresponding counter DAI and total DAI values after each scheduled DCI are denoted as (counter DAI, total DAI). There are two types of PDSCHs scheduled in this example with some PDSCHs associated with a feedback disabled HARQ process while the other PDSCHs associated with a feedback enabled HARQ process. The counter DAI is only updated by a gNB (i.e., incremented) when scheduling a PDSCH associated with a feedback enabled HARQ process (e.g., the PDSCHs scheduled in Serving Cell 0 in monitoring occasion 0 and in Serving Cell 1 in monitoring occasion 4). Similarly, the total DAI is only updated by a gNB (i.e., incremented) when scheduling a PDSCH associated with a feedback enabled HARQ process. For this example, the Type-2 HARQ codebook size is two (2) whereas in the example in FIG. 3, which follows NR Release 15 procedures, the Type-2 HARQ codebook size is six (6). Hence, the proposed solution achieves notable HARQ ACK/NACK feedback overhead reduction.

One example implementation of an embodiment of the proposed solution may be captured in 3GPP Technical Specification (TS) 38.213 by including the changes highlighted below. Denote by $V_{C-DAI,c,m}^{DL} \in \{1,2,3,4\}$ the value of the counter DAI in DCI format 1_0 or DCI format 1_1 for scheduling on serving cell c in PDCCH monitoring occasion m according to Table 9.1.3-1 in 3GPP TS 38.213 V15.6.0. Denote by $V_{T-DAI,k}^{DL} \in \{1,2,3,4\}$ the value of the total DAI in DCI format 1_1 in PDCCH monitoring occasion m according to Table 9.1.3-1 in 3GPP TS 38.213 V15.6.0. The UE assumes a same value of total DAI in all DCI formats 1_1 in PDCCH monitoring occasion m.

If the UE transmits HARQ-ACK information in a PUCCH in slot n and for any PUCCH format, the UE determines the $\tilde{O}_0^{ACK}, \tilde{O}_1^{ACK}, \ldots, \tilde{O}_{O^{ACK}-1}^{ACK}$, for a total number of $O_{ACK}$ HARQ-ACK information bits, according to the following modified pseudo-code in 3GPP TS 38.213 V15.6.0, section 9.1.3:

Set m=0-PDCCH with DCI format 1_0 or DCI format 1_1 monitoring occasion
index: lower index corresponds to earlier PDCCH with DCI format 1_0 or DCI format 1_1 monitoring occasion
Set j = 0
Set $V_{temp}$ = 0
Set $V_{temp2}$ = 0

-continued

```
Set V_s = Ø
Set N_cells^DL to the number of serving cells configured by higher layers for the UE
Set M to the number of PDCCH monitoring occasion(s)
while m < M
    Set c = 0-serving cell index: lower indexes correspond to lower RRC indexes of
        corresponding cell
    while c < N_cells^DL
        if PDCCH monitoring occasion m is before an active DL BWP change on serving
        cell c or an active UL BWP change on the PCell and an active DL BWP change
        is not triggered by a DCI format 1_1 in PDCCH monitoring occasion m , or if
        there is a PDSCH on serving cell c associated with PDCCH in PDCCH
        monitoring occasion m where HARQ A/N feedback for the
        corresponding HARQ process is disabled
            c = c + 1
        else
            if there is a PDSCH on serving cell c associated with PDCCH in PDCCH
            monitoring occasion m and HARQ A/N feedback for the corresponding
            HARQ process is not disabled, or there is a PDCCH indicating SPS PDSCH
            release on serving cell c
                if V_{C-DAI,c,m}^{DL} ≤ V_temp
                    j = j + 1
                end if
                V_temp = V_{C-DAI,c,m}^{DL}
                if V_{T-DAI,m}^{DL} = Ø
                    V_{temp 2} = V_{C-DAI,m}^{DL}
                else
                    V_{temp 2} = V_{T-DAI,m}^{DL}
                end if
                if harq-ACK-SpatialBundlingPUCCH is not provided and m is a monitoring
                occasion for PDCCH with DCI format 1_0 or DCI format 1_1 and the UE is
                configured by maxNrofCodeWordsScheduledByDCI with reception of two
                transport blocks for at least one configured DL BWP of at least one serving
                cell,
```

$$\tilde{o}^{ACK}_{8j+2(V^{DL}_{C-DAI,c,m}-1)} = \text{HARQ-ACK information bit corresponding to the first}$$

transport block of this cell;

$$\tilde{o}^{ACK}_{8j+2(V^{DL}_{C-DAI,c,m}-1)+1} = \text{HARQ-ACK information bit corresponding to the}$$

second transport block of this cell.

```
                V_s = V_s ∪ {8j + 2(V_{C-DAI,c,m}^{DL} - 1), 8j + 2(V_{C-DAI,c,m}^{DL} - 1) + 1}
            elseif harq-ACK-SpatialBundlingPUCCH is provided to the UE and m is a
            monitoring occasion for PDCCH with DCI format 1_1 and the UE is
            configured by maxNrofCodeWordsScheduledByDCI with reception of two
            transport blocks in at least one configured DL BWP of a serving cell,
```

$$\tilde{o}^{ACK}_{4j+V^{DL}_{C-DAI,c,m}-1} = \text{binary AND operation of the HARQ-ACK information}$$

bits corresponding to the first and second transport blocks of this cell

```
                V_s = V_s ∪ {4j + V_{C-DAI,c,m}^{DL} - 1}
            else
```

$$\tilde{o}^{ACK}_{4j+V^{DL}_{C-DAI,c,m}-1} = \text{HARQ-ACK information bit of this cell}$$

```
                V_s = V_s ∪ {4j + V_{C-DAI,c,m}^{DL} - 1}
            end if
        end if
        c = c + 1
    end if
end while
m = m + 1
end while
if V_temp2 < V_temp
    j = j + 1
end if
if harq-ACK-SpatialBundlingPUCCH is not provided to the UE and the UE is configured
by maxNrofCodeWordsScheduledByDCI with reception of two transport blocks for at
least one configured DL BWP of a serving cell,
    O^ACK = 2 · (4 · j + V_{temp 2})
else
    O^ACK = 4 · j + V_{temp 2}
end if
õ_i^ACK = NACK for any i ∈ {0, 1, . . . , O^ACK −1}\V_s
```

Some exemplary complementary embodiments are as follows. Other methods are described here on constructing HARQ-ACK codebooks for a configuration with both feedback enabled HARQ processes and feedback disabled HARQ processes.

In one embodiment, the existing structure of the HARQ-ACK codebook, including both Type-1 HARQ-ACK codebook and Type-2 HARQ-ACK codebook, is reused. In one example, for each entry in the codebook corresponding to feedback disabled HARQ processes, the UE feeds back a reserved value such as NACK. In another example, for each entry in the codebook corresponding to feedback disabled HARQ processes, the UE feeds back a value determined based on the decoding outcome of the corresponding PDSCH.

In one embodiment, the DAI in DCI format 0_1 is treated as total DAI in Uplink Control Information (UCI) on PUSCH. In the presence of a configuration with both feedback enabled HARQ processes and feedback disabled HARQ processes, the DAI in DCI format 0_1 is incremented for the PDSCH corresponding to the HARQ process with feedback enabled.

In one embodiment, the DAI fields are reserved (e.g., filled with dummy bits) in DCI format 1_1, 1_0, and 0_1 for a HARQ processes with feedback disabled. The UE may ignore the reserved values when decoding a DCI scheduling HARQ processes with feedback disabled. In another embodiment, the DAI fields in DCI format 1_1 and 0_1 for HARQ processes with feedback disabled carry the true total DCI values calculated based on the procedure described in the main embodiment (c.f. FIG. 4).

In another embodiment, the DAI fields are not present in DCI format 1_1, 1_0, and 0_1 when all the HARQ processes are configured with feedback disabled.

Figure 7A:
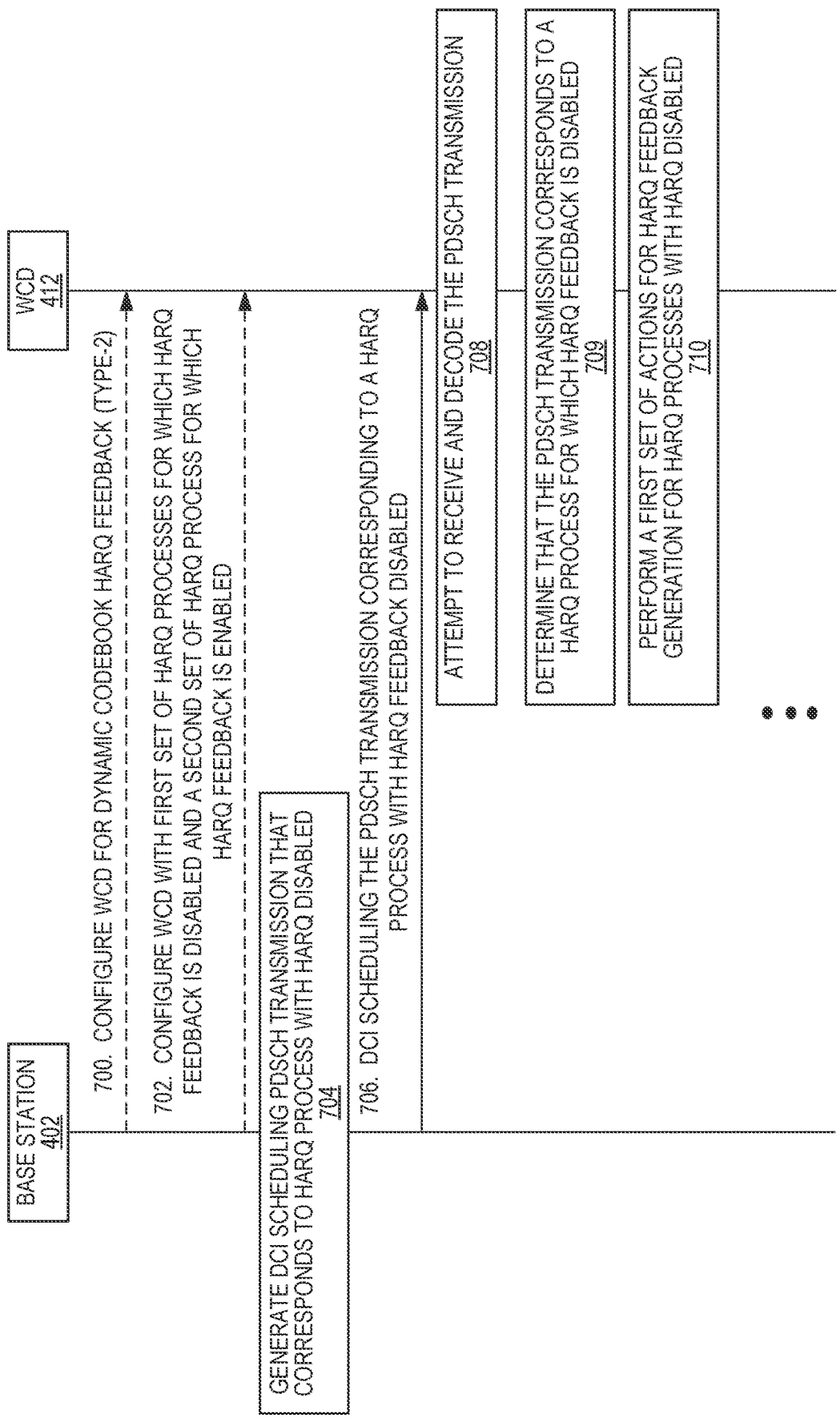
FIGS. 7A and 7B illustrate the operation of a base station (e.g., a NR base station (gNB)) and a WCD (e.g., a UE) in accordance with at least some aspects of at least some embodiments of the present disclosure.
Figure 7B:
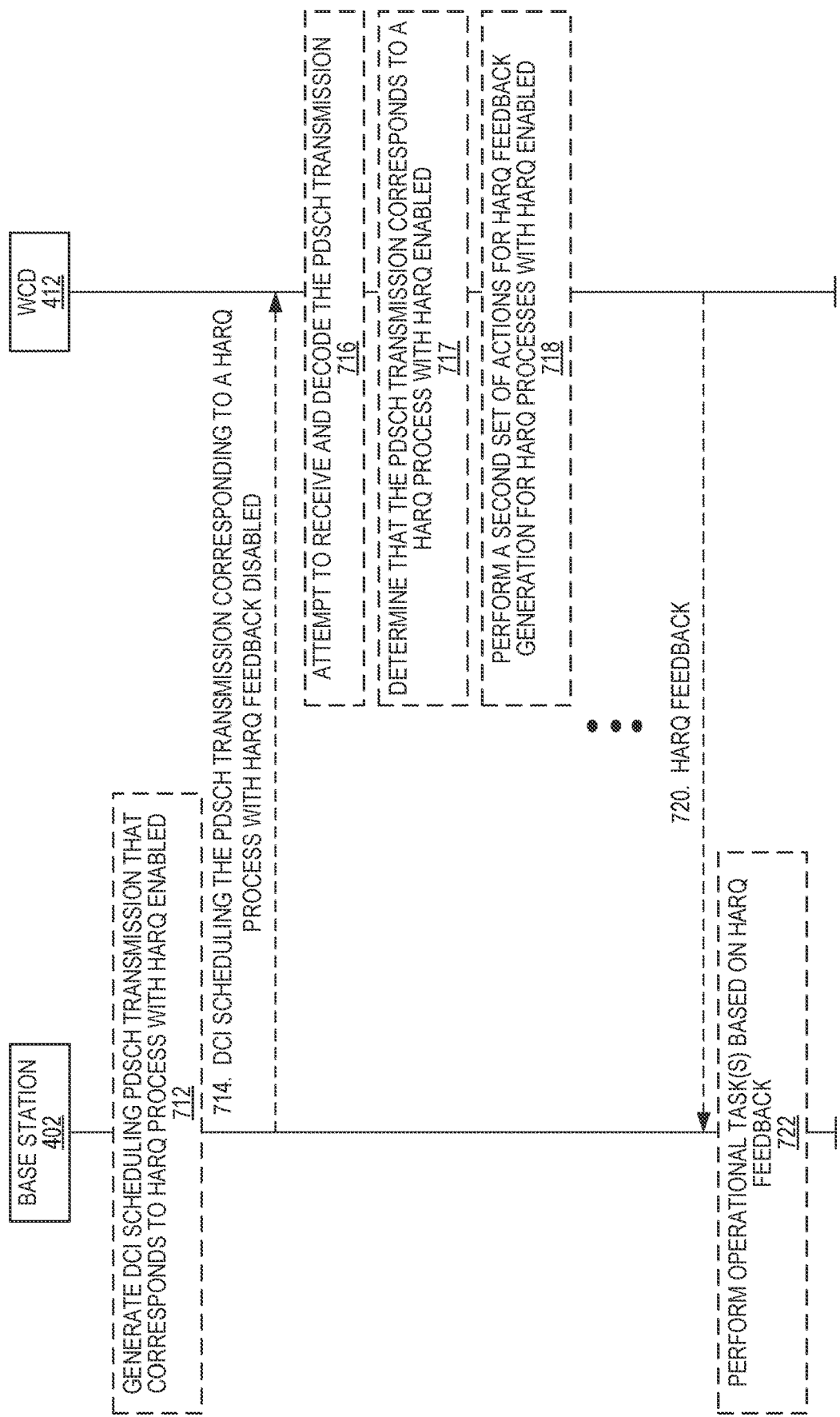

FIGS. 7A and 7B illustrate the operation of a base station 402 (e.g., a gNB) and a WCD 412 (e.g., a UE) in accordance with at least some aspects of at least some of the embodiments described above. Optional steps are represented by dashed lines or dashed boxes. Note that this process is only an example. It should also be noted that while the base station 402 (e.g., gNB) is illustrated as a single box or element, depending on the particular implementation, the base station 402 (e.g., gNB) may be implemented as a single network node or may be distributed across two or more network nodes. For example, the base station 402 may be implemented as two separate network nodes, namely, a first network node that implements, e.g., the physical (PHY) layer and at least a portion of the Medium Access Control (MAC) layer and a second network node that implements higher layers and possibly a portion of the MAC layer. As a specific example, in the case of a gNB, the functionality of the gNB may be separated between a gNB-CU and one or more gNB-DUs. In this regard, steps or functions described herein as being performed by the base station 402 or gNB may be performed in a distributed manner. For example, a network node that implements the higher layer functionality may "initiate" transmission of a particular message (e.g., by sending the message to another network node that implements the lower layer(s)), thereby causing the other network node that implements the lower layer functionality to actually transmit the particular message.

As illustrated, the base station 402 optionally configures the WCD 412 for dynamic HARQ feedback (e.g., Type-2 HARQ feedback in 3GPP NR) (step 700). Alternatively, the WCD 412 may otherwise be instructed or decide to use dynamic HARQ feedback or may use dynamic HARQ feedback by default. The base station 402 configures the WCD 412 with a first set of HARQ processes with HARQ feedback disabled and a second set of HARQ processes with HARQ feedback enabled (step 702). The base station 402 generates DCI scheduling a PDSCH transmission that corresponds to one of the HARQ processes in the set of HARQ processes for which HARQ feedback is disabled (step 704) and transmits this DCI to the WCD 412 (step 706). Notably, when generating the DCI, the base station 402 may refrain from incrementing the counter DAI and, if a total DAI is present, also refrains from adjusting the total DAI for this PDSCH transmission, as discussed above. In addition, later in step 722, the base station 402 does not expect HARQ feedback for this PDSCH transmission (i.e., the base station 402 interprets the dynamic HARQ codebook reported by the WCD 412 such that this PDSCH transmission is not taken into account).

At the WCD 412, the WCD 412 receives and decodes the DCI (step 706) and then attempts to receive and decode the PDSCH transmission scheduled by the DCI (step 708). In addition, as discussed above, the WCD 412 determines that the PDSCH transmission corresponds to a HARQ process for which HARQ feedback is disabled (step 709) and, as such, performs a first set of actions or procedures related to HARQ feedback generation (step 710). As discussed above, this first set of actions or procedures may be those described above with respect to actions 504 through 510 of FIG. 5.

Sometime thereafter, the base station 402 may generate DCI scheduling another PDSCH transmission that corresponds to one of the HARQ processes in the set of HARQ processes for which HARQ feedback is enabled (step 712) and transmits this DCI to the WCD 412 (step 714). Notably, when generating the DCI, the base station 402 adjusts the counter DAI and, if present, the total DAI. In addition, later in step 722, the base station 402 expects HARQ feedback for this PDSCH transmission (i.e., the base station 402 interprets the dynamic HARQ codebook reported by the WCD 412 such that this PDSCH transmission is taken into account).

At the WCD 412, the WCD 412 receives and decodes the DCI (step 714) and then attempts to receive and decode the PDSCH transmission scheduled by the DCI (step 716). In addition, as discussed above, the WCD 412 determines that the PDSCH transmission corresponds to a HARQ process for which HARQ feedback is enabled (step 717) and, as such, performs a second set of actions or procedures related to HARQ feedback generation (step 718). As discussed above, this second set of actions or procedures may be those described above with respect to actions 512 through 518 of FIG. 5.

The process may continue in this manner where the base station 402 transmits and the WCD 412 attempts to receive and decode additional PDSCH transmissions corresponding to different HARQ processes. At some point, the WCD 412 transmits HARQ feedback including HARQ feedback for the PDSCH transmissions that correspond to HARQ processes with HARQ feedback enabled (but excluding any HARQ feedback for the PDSCH transmissions for which HARQ feedback is disabled) (step 720). The base station 402 receives this HARQ feedback and may perform one or more operational tasks based on this HARQ feedback (e.g., perform retransmissions for any PDSCH transmissions that were NACK'd) (step 722).

Figure 7C:
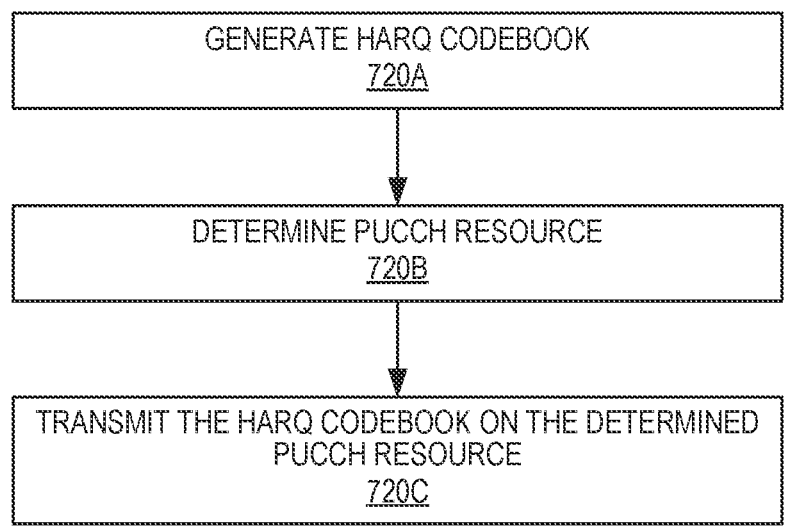
FIG. 7C illustrates one example of the step of sending the HARQ feedback information in the process of FIGS. 7A and 7B.

FIG. 7C illustrates one example of step 720 of FIG. 7. In this example, in order to send the HARQ feedback, the WCD 412 generates a HARQ codebook comprising HARQ feedback for multiple PDCCH transmissions (step 720A). The generated HARQ codebook includes, in this example, the HARQ feedback for the second PDSCH transmission. The WCD 412 determines a PUCCH resource for sending the HARQ codebook based on a PUCCH Resource Indicator (PRI) in a last DCI received and decoded for a PDSCH transmission for which HARQ feedback is included in the HARQ codebook (step 720B). The WCD 412 sends, or transmits, the HARQ codebook to a network node on the determined PUCCH resource (step 720C).

Figure 8:
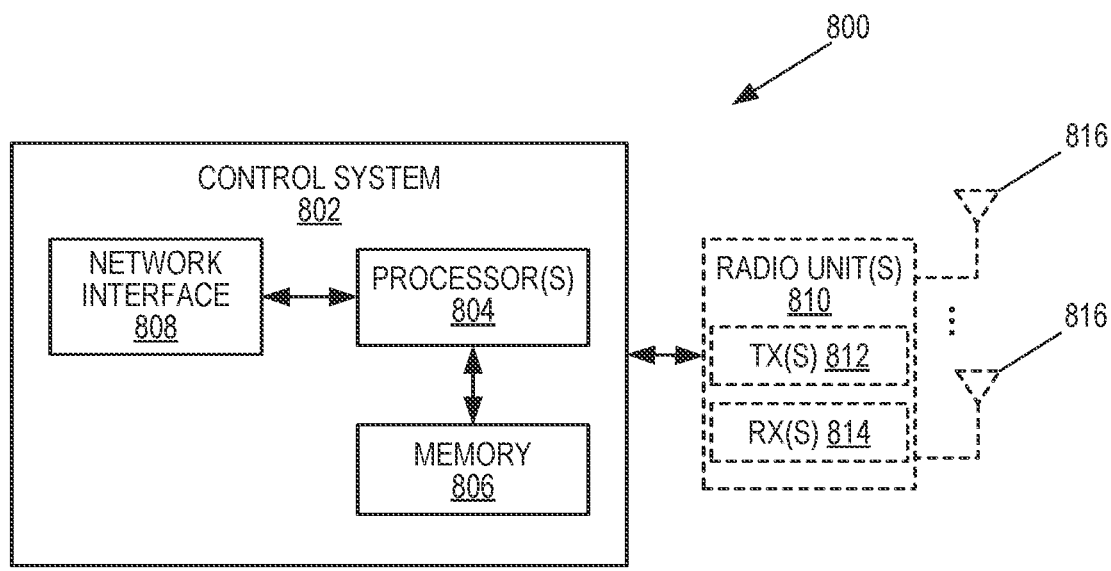
FIGS. 8 through 10 are schematic block diagrams of example embodiments of a network node.

FIG. 8 is a schematic block diagram of a radio access node 800 according to some embodiments of the present disclosure. Optional features are represented by dashed boxes. The radio access node 800 may be, for example, a base station 402 or 406 or a network node that implements all or part of the functionality of the base station 402 or gNB described herein. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein (e.g., one or more functions of a network node, base station, or gNB described above, e.g., with respect to FIGS. 5, 6, 7A, and 7B). In some embodiments, the function(s) are implemented in software that is stored, e.g., in the memory 806 and executed by the one or more processors 804.

Figure 9:
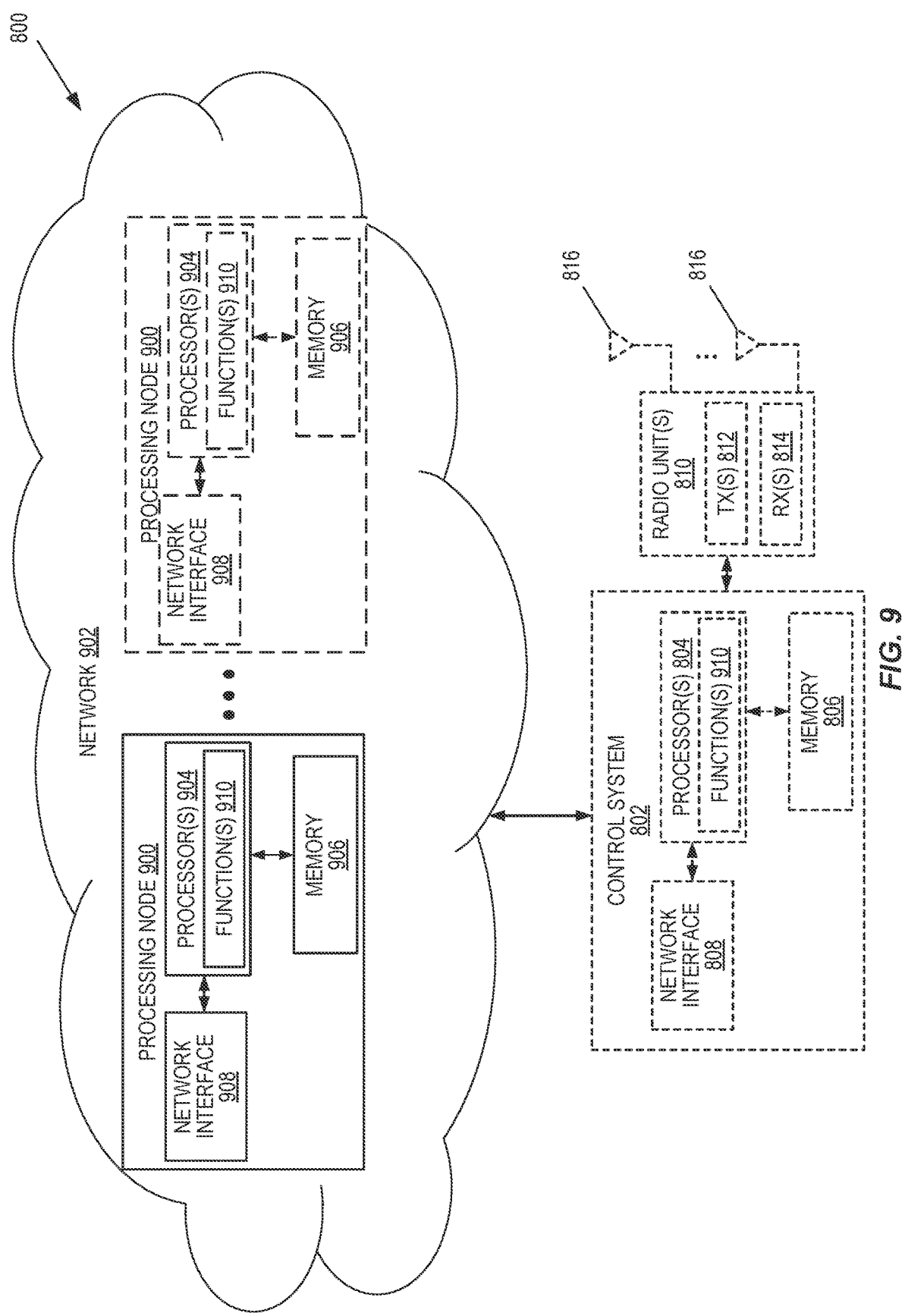

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 may include the control system 802 and/or the one or more radio units 810, as described above. The control system 802 may be connected to the radio unit(s) 810 via, for example, an optical cable or the like. The radio access node 800 includes one or more processing nodes 900 coupled to or included as part of a network(s) 902. If present, the control system 802 or the radio unit(s) are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the radio access node 800 described herein (e.g., one or more functions of a network node, base station, or gNB described above, e.g., with respect to FIGS. 5, 6, 7A, and 7B) are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein (e.g., one or more functions of a network node, base station, or gNB described above, e.g., with respect to FIGS. 5, 6, 7A, and 7B) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
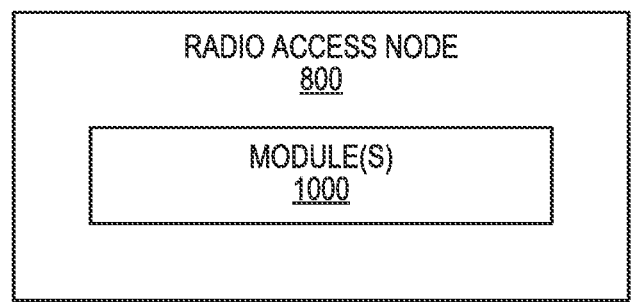

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein (e.g., one or more functions of a network node, base station, or gNB described above, e.g., with respect to FIGS. 5, 6, 7A, and 7B). This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
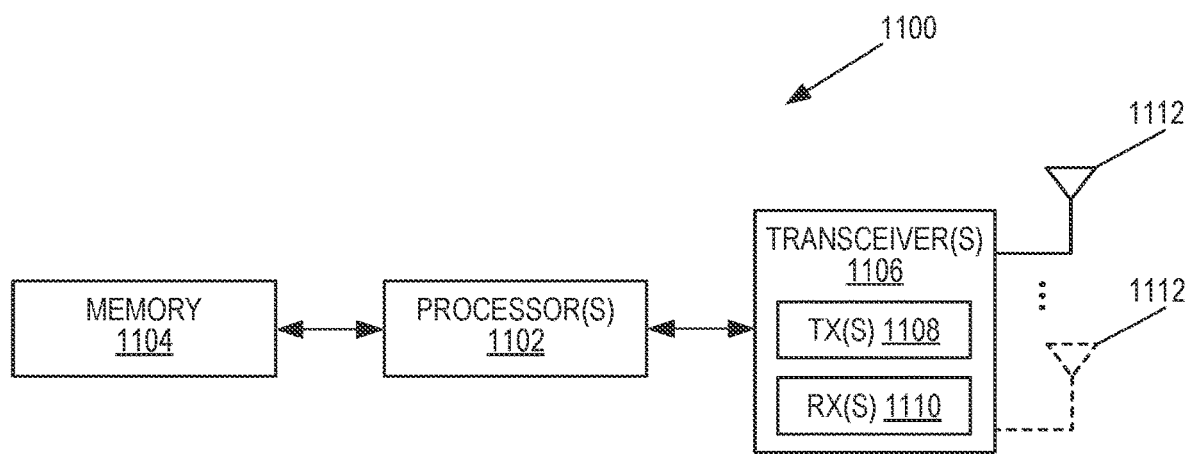
FIGS. 11 and 12 are schematic block diagrams of example embodiments of a WCD.

FIG. 11 is a schematic block diagram of a wireless communication device 1100 according to some embodiments of the present disclosure. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above (e.g., one or more functions of a wireless communication device 412 or UE above, e.g., with respect to FIGS. 5, 6, 7A, and 7B) may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
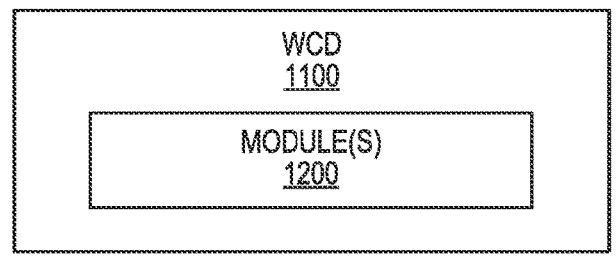

FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein (e.g., one or more functions of a wireless communication device 412 or UE above, e.g., with respect to FIGS. 5, 6, 7A, and 7B).

Figure 13:
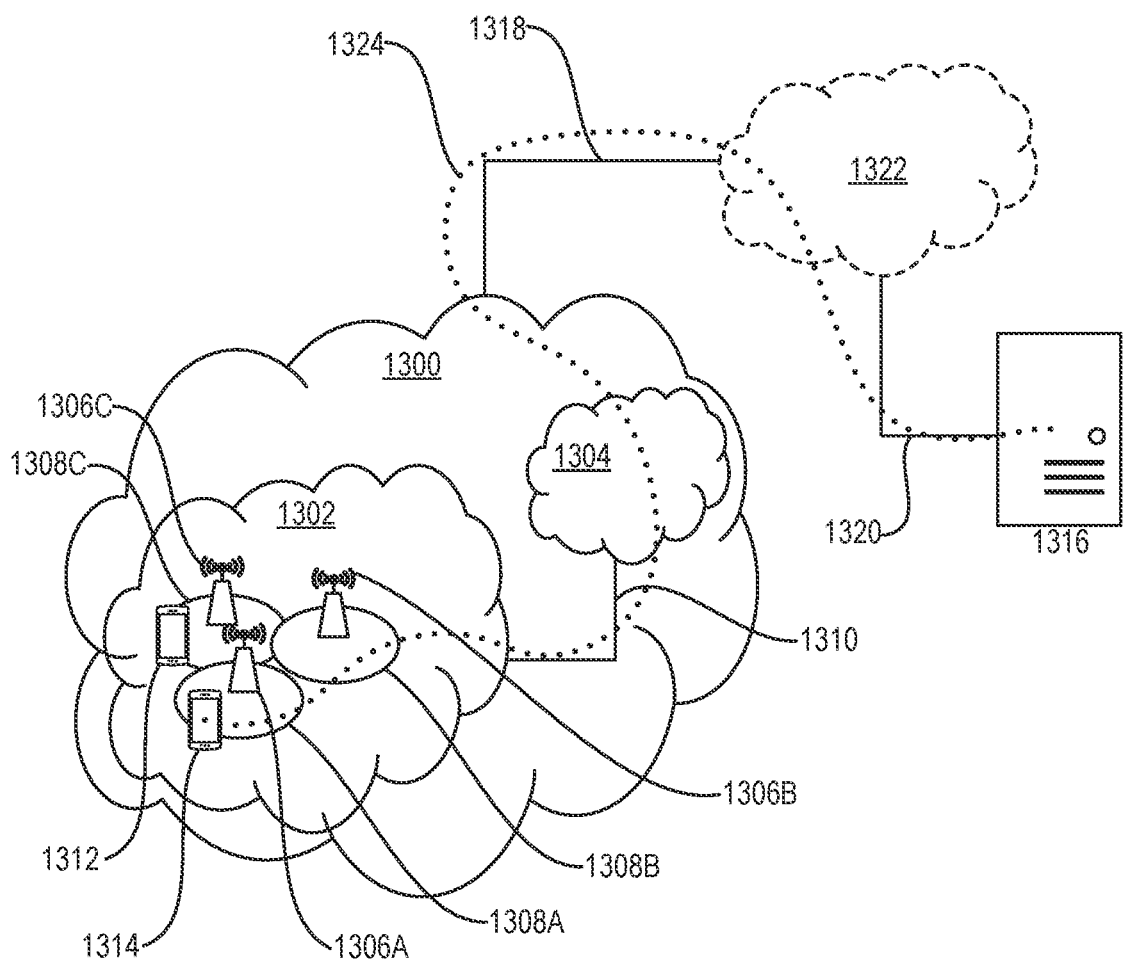
FIG. 13 illustrates an example embodiment of a communication system in which embodiments of the present disclosure may be implemented.

With reference to FIG. 13, in accordance with an embodiment, a communication system includes a telecommunication network 1300, such as a 3GPP-type cellular network, which comprises an access network 1302, such as a RAN, and a core network 1304. The access network 1302 comprises a plurality of base stations 1306A, 1306B, 1306C, such as Node Bs, eNBs, gNBs, or other types of wireless Access Points (APs), each defining a corresponding coverage area 1308A, 1308B, 1308C. Each base station 1306A, 1306B, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloud-implemented server, a distributed server, or as processing resources in a server farm. The host computer 1316 may be under the ownership or control of a service provider, or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 13 as a whole enables connectivity between the connected UEs 1312, 1314 and the host computer 1316. The connectivity may be described as an Over-the-Top (OTT) connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 14. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 14) served by the base station 1418. The communication interface 1422 may be configured to facilitate a connection 1428 to the host computer 1402. The connection 1428 may be direct or it may pass through a core network (not shown in FIG. 14) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain a wireless connection 1426 with a base station serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

Figure 14:
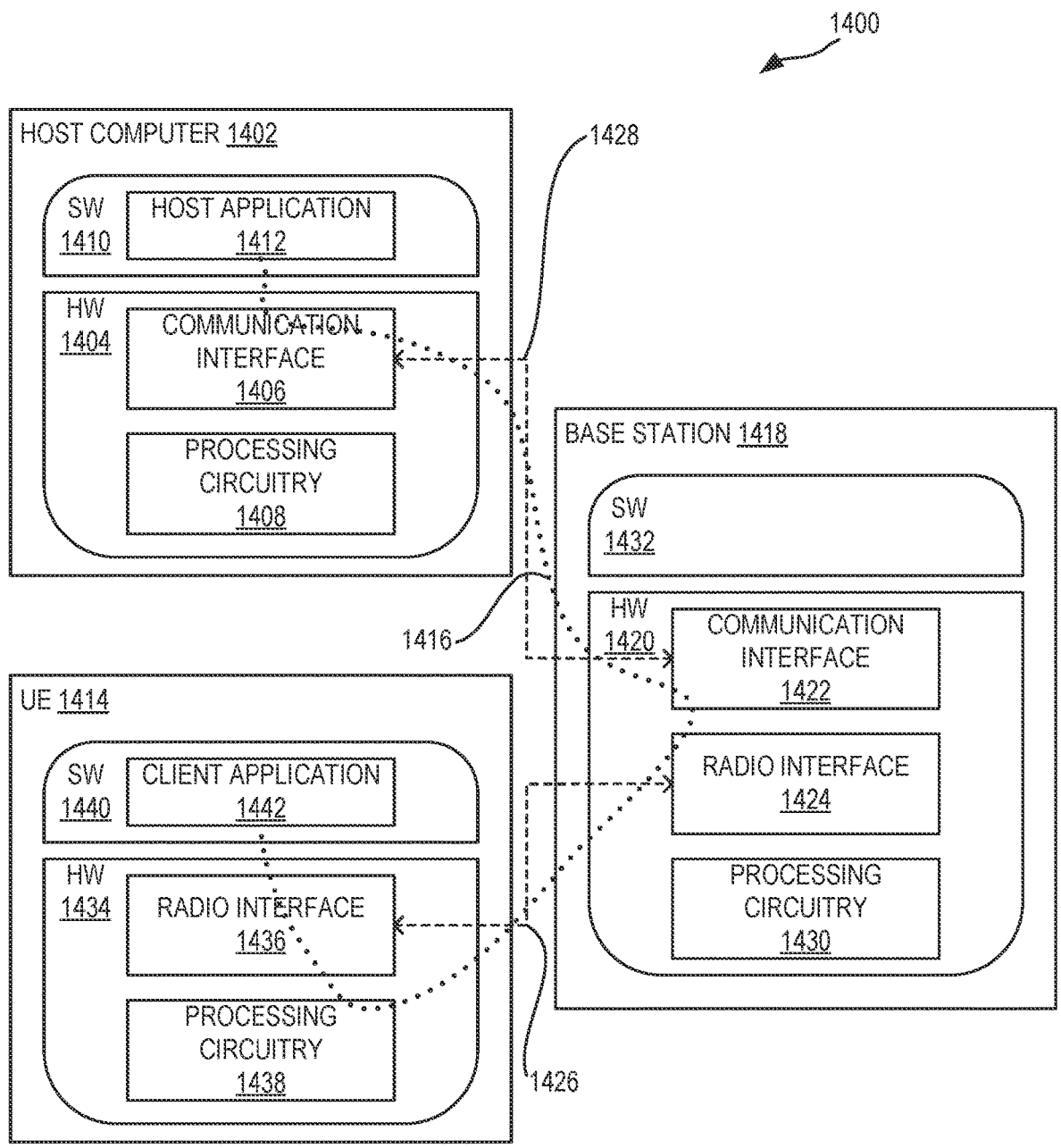
FIG. 14 illustrates example embodiments of the host computer, base station, and UE of FIG. 13.

It is noted that the host computer 1402, the base station 1418, and the UE 1414 illustrated in FIG. 14 may be similar or identical to the host computer 1316, one of the base stations 1306A, 1306B, 1306C, and one of the UEs 1312, 1314 of FIG. 13, respectively. This is to say, the inner workings of these entities may be as shown in FIG. 14 and independently, the surrounding network topology may be that of FIG. 13.

In FIG. 14, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment.

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1418, and it may be unknown or imperceptible to the base station 1418. Such procedures and functionalities may be known and practiced in the art. In certain embodiments, measurements may involve proprietary UE signaling facilitating the host computer 1402's measurements of throughput, propagation times, latency, and the like. The measurements may be implemented in that the software 1410 and 1440 causes messages to be transmitted, in particular empty or 'dummy' messages, using the OTT connection 1416 while it monitors propagation times, errors, etc.

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1600 of the method, the host computer provides user data. In an optional sub-step (not shown) the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless communication device (412) for dynamic codebook based Hybrid Automatic Repeat Request, HARQ, feedback where the wireless communication device (412) is configured with a first set of HARQ processes for which HARQ feedback is disabled and a second set of HARQ processes for which HARQ feedback is enabled, the method comprising one or more of: receiving (502; 706) first downlink control information that schedules a first downlink shared channel transmission to the wireless communication device (412); determining (502; 709) that the first downlink shared channel transmission corresponds to one of the first set of HARQ processes for which HARQ feedback is disabled; and, upon determining (502; 709) that the first downlink shared channel transmission corresponds to one of the first set of HARQ processes for which HARQ feedback is disabled, performing (504-510; 710) a first set of actions for HARQ feedback generation for HARQ processes with HARQ feedback disabled.

Embodiment 2: The method of embodiment 1 wherein the first set of actions is different than a second set of actions for HARQ feedback generation for HARQ processes with HARQ feedback enabled.

Embodiment 3: The method of embodiment 1 further comprising one or more of: receiving (500; 714) second downlink control information that schedules second first downlink shared channel transmission to the wireless communication device (412); determining (502; 717) that the second downlink shared channel transmission corresponds to one of the second set of HARQ processes for which HARQ feedback is enabled; and, upon determining (502; 717) that the second downlink shared channel transmission corresponds to one of the second set of HARQ processes for which HARQ feedback is enabled, performing (512-518; 718) a second set of actions for HARQ feedback generation for HARQ processes with HARQ feedback enabled, wherein the second set of actions is different than the first set of actions.

Embodiment 4: The method of embodiment 2 or 3 wherein the second set of actions comprise one or more of the following actions: assuming that a counter Downlink Assignment Indicator, DAI, comprised in the second downlink control information is incremented for the second downlink shared channel transmission; assuming that a total DAI comprised in the second downlink control information is incremented for the second downlink shared channel transmission; and generating HARQ feedback for the second downlink shared channel transmission such that a size of a dynamic codebook comprising HARQ feedback is impacted by the second downlink shared channel transmission.

Embodiment 5: The method of any of embodiments 1 to 4 wherein the first set of actions comprise one or more of the following actions: assuming that a counter Downlink Assignment Indicator, DAI, comprised in the first downlink control information is not incremented for the first downlink shared channel transmission; assuming that a total DAI comprised in the first downlink control information is not incremented for the first downlink shared channel transmission; ignoring the counter DAI comprised in the first downlink control information; and refraining from generating HARQ feedback for the first downlink shared channel transmission such that a size of a dynamic codebook comprising HARQ feedback is not impacted by the first downlink shared channel transmission.

Embodiment 6: A method performed by a User Equipment (UE) for constructing a Hybrid Automatic Repeat Request, HARQ, codebook, the method comprising one or more of the following steps: receiving (500; 702), from a network node, configuration information of HARQ ACK/NACK feedback enabling/disabling on a per HARQ process basis with a first set of HARQ processes having HARQ ACK/NACK feedback enabled and a second set of HARQ processes having HARQ ACK/NACK feedback disabled; determining (502; 709, 717) whether a HARQ process indicated in a DCI that schedules a PDSCH has HARQ ACK/NACK feedback enabled or not; and constructing (504-518; 710, 718) a HARQ codebook based on whether the HARQ process indicated in the DCI that schedules the PDSCH has HARQ ACK/NACK feedback enabled or not.

Embodiment 7: The method of embodiment 6 further comprising sending (720) HARQ feedback comprising the HARQ codebook to a network node.

Embodiment 8: The method of embodiment 7 wherein sending (720) the HARQ feedback comprises: determining a PUCCH resource for sending the HARQ feedback based on a PUCCH resource indicator field in a last DCI (e.g., a last DCI received and decoded for a PDSCH transmission for which HARQ feedback is comprised in the HARQ codebook); and sending the HARQ feedback based on the constructed HARQ codebook.

Embodiment 9: The method of any of embodiments 6-8, where the HARQ codebook is a dynamic HARQ codebook of type 1

Embodiment 10: The method of any of embodiments 6-9, where the construction of the HARQ codebook includes: counter DAI indicated in the DCI is assumed not to be incremented by a wireless device or a network node if the HARQ process indicated in the DCI has HARQ ACK/NACK feedback disabled.

Embodiment 10b: The method of any of embodiments 6-9, where the construction of the HARQ codebook includes: counter DAI indicated in the DCI has not been incremented by a network node if the HARQ process indicated in the DCI has HARQ ACK/NACK feedback disabled.

Embodiment 11: The method of any of embodiments 6-10, where the construction of the HARQ codebook includes: counter DAI indicated in the DCI is assumed to be incremented by a network node if the HARQ process indicated in the DCI has HARQ ACK/NACK feedback enabled.

Embodiment 11b: The method of any of embodiments 6-10, where the construction of the HARQ codebook includes: counter DAI indicated in the DCI has been incremented by a network node if the HARQ process indicated in the DCI has HARQ ACK/NACK feedback enabled.

Embodiment 12: The method of any of embodiments 6-11, where the construction of the HARQ codebook includes: total DAI indicated in the DCI is assumed not to be incremented by the wireless device if the HARQ process indicated in the DCI has HARQ ACK/NACK feedback disabled.

Embodiment 12b: The method of any of embodiments 6-11, where the construction of the HARQ codebook includes: total DAI indicated in the DCI has not been incremented by a network node if the HARQ process indicated in the DCI has HARQ ACK/NACK feedback disabled.

Embodiment 13: The method of any of embodiments 6-12, where the construction of the HARQ codebook includes: total DAI indicated in the DCI is assumed to be incremented by the wireless device if the HARQ process indicated in the DCI has HARQ ACK/NACK feedback enabled.

Embodiment 13b: The method of any of embodiments 6-12, where the construction of the HARQ codebook includes: total DAI indicated in the DCI has been incremented by a network node if the HARQ process indicated in the DCI has HARQ ACK/NACK feedback enabled.

Embodiment 14: The method of any of embodiments 8-13, where the last DCI is a DCI where the HARQ process indicated in the DCI has HARQ ACK/NACK feedback enabled.

Group B Embodiments

Embodiment 15: A method performed by a network node that implements at least some functionality of a base station (402) for dynamic codebook based Hybrid Automatic Repeat Request, HARQ, feedback for a wireless communication device (412) configured with a first set of HARQ processes for which HARQ feedback is disabled and a second set of HARQ processes for which HARQ feedback is enabled, the method comprising one or more of: generating (704) first downlink control information that schedules a first downlink shared channel transmission to the wireless communication device (412), the first downlink shared channel transmission corresponding to one of the first set of HARQ processes for which HARQ feedback is disabled, wherein generating (704) the first downlink control information comprises generating (704) the first downlink control information in accordance with a first set of rules for HARQ processes with HARQ feedback disabled; and transmitting or initiating transmission of (706) the first downlink control information to the wireless communication device (412).

Embodiment 16: The method of embodiment 15 wherein the first set of rules is different than a second set of rules for HARQ processes with HARQ feedback enabled.

Embodiment 17: The method of embodiment 15 further comprising one or more of: generating (712) second downlink control information that schedules a second downlink shared channel transmission to the wireless communication device (412), the second downlink shared channel transmission corresponding to one of the second set of HARQ processes for which HARQ feedback is enabled, wherein generating (712) the second downlink control information comprises generating (712) the second downlink control information in accordance with a second set of rules for HARQ processes with HARQ feedback enabled, the second set of rules being different than the first set of rules; and transmitting or initiating transmission of (714) the second downlink control information to the wireless communication device (412).

Embodiment 18: The method of embodiment 16 or 17 wherein the second set of rules comprises one or more of the following rules: a rule that a counter Downlink Assignment Indicator, DAI, comprised in the second downlink control information is incremented for the second downlink shared channel transmission; a rule that a total DAI comprised in the second downlink control information is incremented for the second downlink shared channel transmission; and a rule that a size of a dynamic codebook comprising HARQ feedback is impacted by the second downlink shared channel transmission.

Embodiment 19: The method of any of embodiments 15 to 18 wherein the first set of rules comprises one or more of the following rules: a rule that a counter Downlink Assignment Indicator, DAI, comprised in the first downlink control information is not incremented for the first downlink shared channel transmission; a rule that a total DAI comprised in the first downlink control information is not incremented for the first downlink shared channel transmission; a rule that the counter DAI comprised in the first downlink control information can be ignored by the wireless communication device (412); and a rule that a size of a dynamic codebook comprising HARQ-ACK feedback is not impacted by the first downlink shared channel transmission.

Group C Embodiments

Embodiment 20: A wireless communication device comprising: processing circuitry configured to perform any of the steps of any of the Group A embodiments; and power supply circuitry configured to supply power to the wireless communication device.

Embodiment 21: A base station comprising: processing circuitry configured to perform any of the steps of any of the Group B embodiments; and power supply circuitry configured to supply power to the base station.

Embodiment 22: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 23: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 24: The communication system of the previous embodiment further including the base station.

Embodiment 25: The communication system of the previous 2 embodiments, further including the UE, wherein the UE is configured to communicate with the base station.

Embodiment 26: The communication system of the previous 3 embodiments, wherein: the processing circuitry of the host computer is configured to execute a host application, thereby providing the user data; and the UE comprises processing circuitry configured to execute a client application associated with the host application.

Embodiment 27: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 28: The method of the previous embodiment, further comprising, at the base station, transmitting the user data.

Embodiment 29: The method of the previous 2 embodiments, wherein the user data is provided at the host computer by executing a host application, the method further comprising, at the UE, executing a client application associated with the host application.

Embodiment 30: A User Equipment, UE, configured to communicate with a base station, the UE comprising a radio interface and processing circuitry configured to perform the method of the previous 3 embodiments.

Embodiment 31: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 32: The communication system of the previous embodiment, wherein the cellular network further includes a base station configured to communicate with the UE.

Embodiment 33: The communication system of the previous 2 embodiments, wherein: the processing circuitry of the host computer is configured to execute a host application, thereby providing the user data; and the UE's processing circuitry is configured to execute a client application associated with the host application.

Embodiment 34: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 35: The method of the previous embodiment, further comprising at the UE, receiving the user data from the base station.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core Network
5GS Fifth Generation System
ACK Acknowledgement
AMF Access and Mobility Function
AP Access Point
ASIC Application Specific Integrated Circuit
AUSF Authentication Server Function
CA Carrier Aggregation
CBG Code Block Group
CC Component Carrier
CPU Central Processing Unit
CSI Channel State Information
DAI Downlink Assignment Indicator
DCI Downlink Control Information
DSP Digital Signal Processor
eMBB Enhanced Mobile Broadband
eNB Enhanced or Evolved Node B
FPGA Field Programmable Gate Array
GEO Geostationary Earth Orbit
gNB New Radio Base Station
gNB-CU New Radio Base Station Central Unit
gNB-DU New Radio Base Station Distributed Unit
HARQ Hybrid Automatic Repeat Request
HSS Home Subscriber Server
ID Identity
IoT Internet of Things
km Kilometer
LEO Low Earth Orbit
LTE Long Term Evolution
MAC Medium Access Control
MEO Medium Earth Orbit
MME Mobility Management Entity
mMTC Massive Machine Type Communication
ms Millisecond
MTC Machine Type Communication
NACK Negative Acknowledgement
NEF Network Exposure Function
NF Network Function
ng-eNB Next Generation Enhanced or Evolved Node B
NG-RAN Next Generation Radio Access Network
NR New Radio
NRF Network Function Repository Function
NSSF Network Slice Selection Function
NTN Non-Terrestrial Network
OTT Over-the-Top
PC Personal Computer
PCF Policy Control Function
PDCCH Physical Downlink Control Channel
PDSCH Physical Downlink Shared Channel
P-GW Packet Data Network Gateway
PHY Physical
PRI Physical Uplink Control Channel Resource Indicator
PUCCH Physical Uplink Control Channel
PUSCH Physical Uplink Shared Channel
RAM Random Access Memory
RAN Radio Access Network
ROM Read Only Memory
RRC Radio Resource Control
RRH Remote Radio Head
RTT Round Trip Time
SAW Stop-and-Wait
SCEF Service Capability Exposure Function
SMF Session Management Function
SPS Semi-Persistent Scheduling
SR Scheduling Request
TB Transport Block
TBS Transport Block Size
TDD Time Division Duplexing
TDRA Time Domain Resource Assignment
TR Technical Report
TS Technical Specification
UCI Uplink Control Information
UDM Unified Data Management
UE User Equipment
UPF User Plane Function
URLLC Ultra-Reliable and Low Latency Communication
WCD Wireless Communication Device Those skilled in the art will recognize improvements and modifications to the embodiments of the present disclosure.

All such improvements and modifications are considered within the scope of the concepts disclosed herein.

What is claimed is:

1. A method performed by a network node that implements at least some functionality of a base station for dynamic codebook-based Hybrid Automatic Repeat Request Acknowledgement, HARQ-ACK, feedback, the method comprising:
configuring a wireless communication device with a first set of HARQ processes for which HARQ-ACK feedback is disabled and a second set of HARQ processes for which HARQ-ACK feedback is enabled;
generating first downlink control information that schedules a first downlink shared channel transmission to the wireless communication device, the first downlink shared channel transmission corresponding to one of the first set of HARQ processes for which HARQ-ACK feedback is disabled, wherein generating the first downlink control information is associated with a first set of rules for HARQ processes with HARQ-ACK feedback disabled; and
transmitting or initiating transmission of the first downlink control information to the wireless communication device.

2. The method of claim 1 wherein the first set of rules is different than a second set of rules for HARQ processes with HARQ-ACK feedback enabled.

3. The method of claim 2 wherein the second set of rules comprises one or more of the following rules:
a rule that a counter Downlink Assignment Indicator, DAI, comprised in second downlink control information is incremented for a second downlink shared channel transmission;
a rule that a total DAI comprised in the second downlink control information is incremented for the second downlink shared channel transmission; and
a rule that size of a dynamic codebook comprising HARQ-ACK feedback is impacted by the second downlink shared channel transmission.

4. The method of claim 1 further comprising:
generating second downlink control information that schedules a second downlink shared channel transmission to the wireless communication device, the second downlink shared channel transmission corresponding to one of the second set of HARQ processes for which HARQ-ACK feedback is enabled, wherein generating the second downlink control information is associated with a second set of rules for HARQ processes with HARQ-ACK feedback enabled, the second set of rules being different than the first set of rules; and
transmitting or initiating transmission of the second downlink control information to the wireless communication device.

5. The method of claim 1, wherein the first set of rules comprises one or more of the following rules:
a rule that a counter Downlink Assignment Indicator, DAI, comprised in the first downlink control information is not incremented for the first downlink shared channel transmission;
a rule that a total DAI comprised in the first downlink control information is not incremented for the first downlink shared channel transmission;
a rule that the counter DAI comprised in the first downlink control information can be ignored by the wireless communication device; and
a rule that size of a dynamic codebook comprising HARQ-ACK feedback is not impacted by the first downlink shared channel transmission.

6. A network node that implements at least some functionality of a base station for dynamic codebook-based Hybrid Automatic Repeat Request Acknowledgement, HARQ-ACK, feedback, the network node adapted to:
configure a wireless communication device with a first set of HARQ processes for which HARQ-ACK feedback is disabled and a second set of HARQ processes for which HARQ-ACK feedback is enabled;
generate first downlink control information that schedules a first downlink shared channel transmission to the wireless communication device, the first downlink shared channel transmission corresponding to one of the first set of HARQ processes for which HARQ-ACK feedback is disabled, wherein generating the first downlink control information is associated with a first set of rules for HARQ processes with HARQ-ACK feedback disabled; and
transmit or initiate transmission of the first downlink control information to the wireless communication device.

7. The network node of claim 6 wherein the first set of rules is different than a second set of rules for HARQ processes with HARQ-ACK feedback enabled.

8. The network node of claim 7 wherein the second set of rules comprises one or more of the following rules:
a rule that a counter Downlink Assignment Indicator, DAI, comprised in second downlink control information is incremented for a second downlink shared channel transmission;
a rule that a total DAI comprised in the second downlink control information is incremented for the second downlink shared channel transmission; and
a rule that size of a dynamic codebook comprising HARQ-ACK feedback is impacted by the second downlink shared channel transmission.

9. The network node of claim 6, wherein the network node is further adapted to:
generate second downlink control information that schedules a second downlink shared channel transmission to the wireless communication device, the second downlink shared channel transmission corresponding to one of the second set of HARQ processes for which HARQ-ACK feedback is enabled, wherein generating the second downlink control information is associated with a second set of rules for HARQ processes with HARQ-ACK feedback enabled, the second set of rules being different than the first set of rules; and
transmit or initiate transmission of the second downlink control information to the wireless communication device.

10. The network node of claim 6, wherein the first set of rules comprises one or more of the following rules:
a rule that a counter Downlink Assignment Indicator, DAI, comprised in the first downlink control information is not incremented for the first downlink shared channel transmission;
a rule that a total DAI comprised in the first downlink control information is not incremented for the first downlink shared channel transmission;
a rule that the counter DAI comprised in the first downlink control information can be ignored by the wireless communication device; and a rule that the size of a dynamic codebook comprising HARQ-ACK feedback is not impacted by the first downlink shared channel transmission.

11. A network node that implements at least some functionality of a base station for dynamic codebook-based Hybrid Automatic Repeat Request Acknowledgement, HARQ-ACK, feedback, the network node comprising processing circuitry configured to cause the network node to:
  configure a wireless communication device with a first set of HARQ processes for which HARQ-ACK feedback is disabled and a second set of HARQ processes for which HARQ-ACK feedback is enabled;
  generate first downlink control information that schedules a first downlink shared channel transmission to the wireless communication device, the first downlink shared channel transmission corresponding to one of the first set of HARQ processes for which HARQ-ACK feedback is disabled, wherein generating the first downlink control information is associated with a first set of rules for HARQ processes with HARQ-ACK feedback disabled; and
  transmit or initiate transmission of the first downlink control information to the wireless communication device.

\* \* \* \* \*